United States Patent
Yoshida et al.

(10) Patent No.: US 9,394,457 B2
(45) Date of Patent: Jul. 19, 2016

(54) PHOTO CURABLE RESIN COMPOSITION, IMAGING DISPLAY DEVICE AND PRODUCTION METHOD THEREOF

(71) Applicant: HITACHI CHEMICAL COMPANY, LTD., Chiyoda-ku, Tokyo (JP)

(72) Inventors: Akihiro Yoshida, Ibaraki (JP); Takeo Tomiyama, Ibaraki (JP); Yousuke Hoshi, Ibaraki (JP); Tetsuya Okazaki, Ibaraki (JP); Youichi Kimura, Ibaraki (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 14/840,505

(22) Filed: Aug. 31, 2015

(65) Prior Publication Data
US 2015/0368499 A1    Dec. 24, 2015

Related U.S. Application Data

(62) Division of application No. 13/848,138, filed on Mar. 21, 2013, now Pat. No. 9,150,706.

(60) Provisional application No. 61/614,038, filed on Mar. 22, 2012.

(51) Int. Cl.
*B44C 1/17* (2006.01)
*G03G 7/00* (2006.01)
(Continued)

(52) U.S. Cl.
CPC .............. *C09D 133/08* (2013.01); *B05D 3/067* (2013.01); *B32B 27/08* (2013.01); *B32B 27/28* (2013.01);
(Continued)

(58) Field of Classification Search
CPC ...... C09D 133/08; B05D 3/067; B32B 27/08; B08K 5/09
See application file for complete search history.

(56) References Cited

U.S. PATENT DOCUMENTS

2005/0193906 A1    9/2005  Nakamura et al.
2010/0003425 A1    1/2010  Kamata et al.
(Continued)

FOREIGN PATENT DOCUMENTS

CN    1725044 A    1/2006
CN    101652803 A    2/2010
(Continued)

OTHER PUBLICATIONS

Notification of Transmittal of Translation of the International Preliminary Report on Patentability (Chapter I or Chapter II) dated Oct. 2, 2014, for International (PCT) Application No. PCT/JP2013/058128, filed Mar. 21, 2013.
(Continued)

*Primary Examiner* — Dah-Wei D Yuan
*Assistant Examiner* — Kristen A Dagenais
(74) *Attorney, Agent, or Firm* — Fitch, Even, Tabin & Flannery LLP

(57) ABSTRACT

A photocurable resin composition which hardly causes leakage and is easily formed into a desired shape and an image display device using this photocurable resin composition are provided. Namely, a photocurable resin composition comprises a compound (A) having a photopolymerizable functional group and an oil gelling agent (B), is provided. Also, an image display device having a laminate structure including an image display unit having an image display part, a transparent protective plate, and a resin layer existent between the image display unit and the transparent protective plate, wherein the resin layer is a cured material of the above-described photocurable resin composition, is provided.

7 Claims, 8 Drawing Sheets

(51) Int. Cl.
*C08K 5/09* (2006.01)
*C09D 133/08* (2006.01)
*C08K 5/20* (2006.01)
*C08L 67/04* (2006.01)
*C08L 67/03* (2006.01)
*B32B 27/28* (2006.01)
*C08L 77/06* (2006.01)
*B32B 27/34* (2006.01)
*B32B 27/08* (2006.01)
*B32B 27/36* (2006.01)
*C08K 5/1575* (2006.01)
*C08K 5/205* (2006.01)
*C08K 5/3462* (2006.01)
*B05D 3/06* (2006.01)

(52) U.S. Cl.
CPC ............... *B32B 27/34* (2013.01); *B32B 27/36* (2013.01); *C08K 5/09* (2013.01); *C08K 5/1575* (2013.01); *C08K 5/20* (2013.01); *C08K 5/205* (2013.01); *C08K 5/3462* (2013.01); *C08L 67/03* (2013.01); *C08L 67/04* (2013.01); *C08L 77/06* (2013.01)

(56) References Cited

U.S. PATENT DOCUMENTS

2010/0142027 A1*  6/2010  Tatsuura ............. G02F 1/13454
                                                            359/268
2011/0080373 A1*  4/2011  Wang .................... G06F 3/044
                                                            345/174

FOREIGN PATENT DOCUMENTS

| JP | 2011-256264 | 12/2011 |
| JP | 2012-040760 | 3/2012 |
| WO | 2010/125854 | 11/2010 |
| WO | 2012/023368 | 2/2012 |

OTHER PUBLICATIONS

International Search Report mailed Jun. 18, 2013, for International Application No. PCT/JP2013/058128.

* cited by examiner

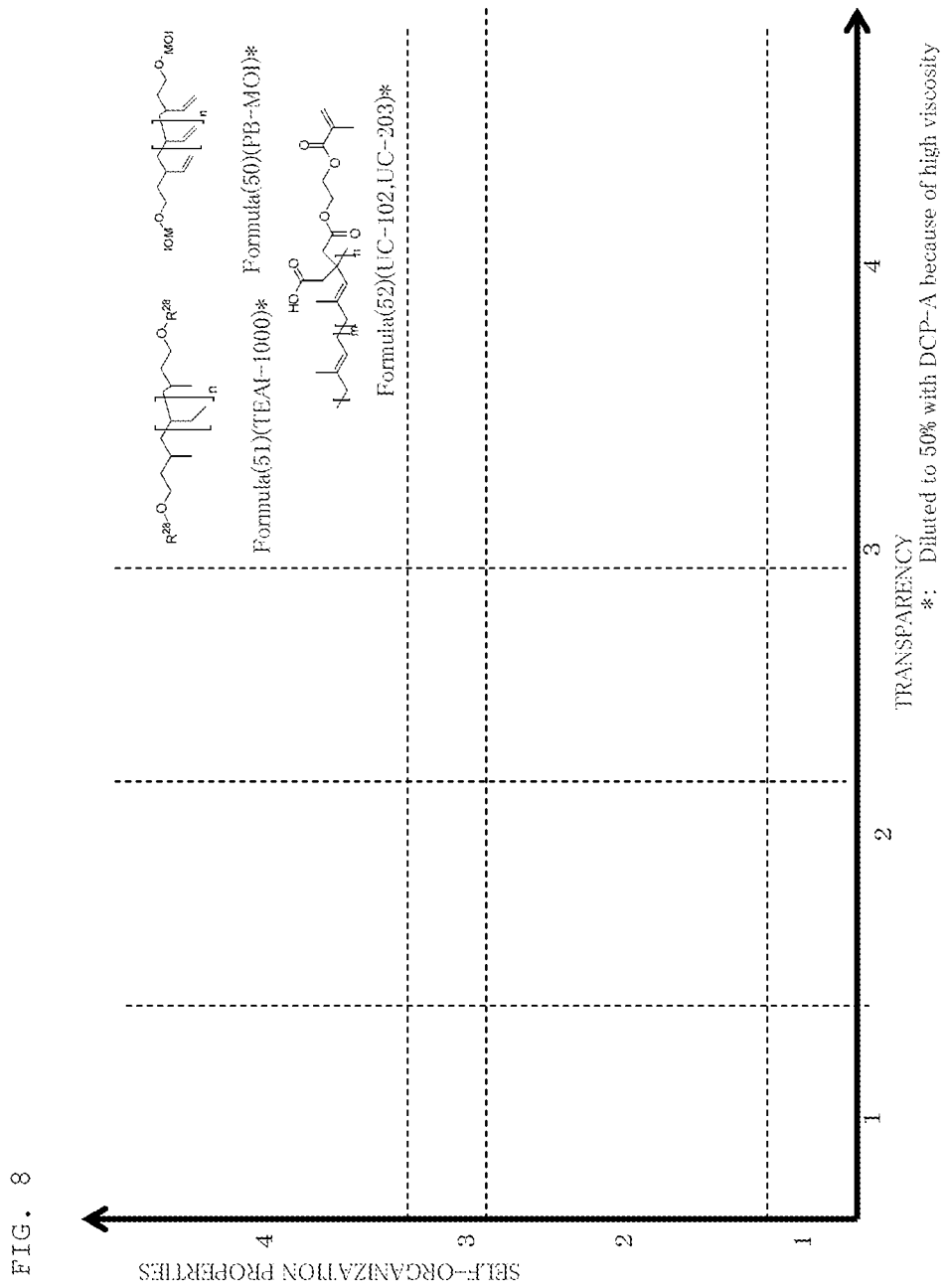

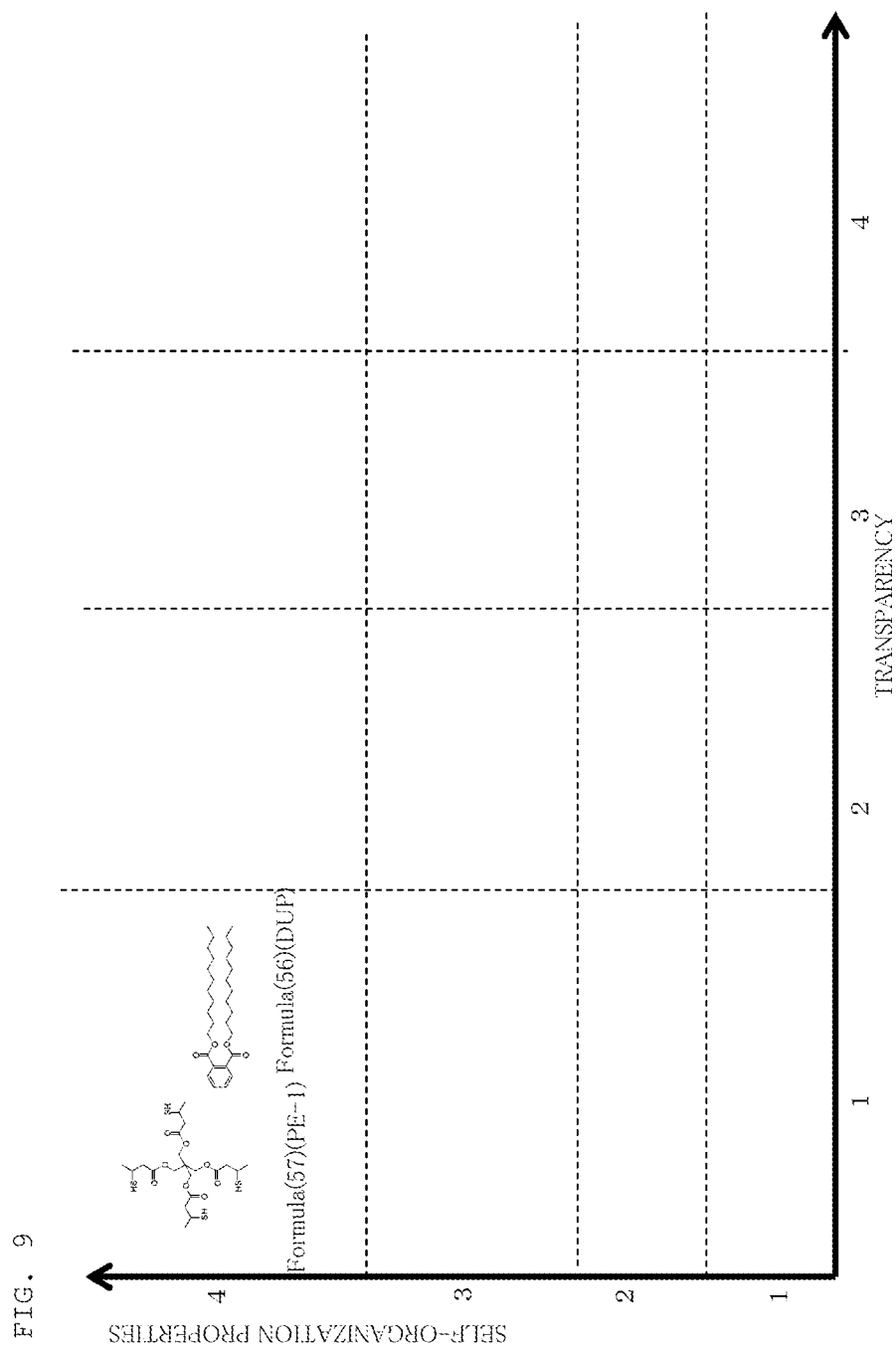

PHOTO CURABLE RESIN COMPOSITION, IMAGING DISPLAY DEVICE AND PRODUCTION METHOD THEREOF

This application is a Divisional application of pending application Ser. No. 13/848,138, filed Mar. 21, 2013, application Ser. No. 13/848,138 is a non-provisional application of provisional Application No. 61/614,038, filed Mar. 22, 2012, the contents of each of which are incorporated herein by reference in their entirety.

BACKGROUND OF THE INVENTION

1. Technical Field

The present invention relates to a photocurable resin composition, an image display device using this photocurable resin composition, and a method for manufacturing the same.

2. Background Art

Photocurable resin compositions are widely used as an adhesive; a pressure-sensitive adhesive; a filler; an optical member such as an optical wave guide, a member for solar batteries; a light emitting diode (LED), a phototransistor, a photodiode, an optical semiconductor element, an image display device, an illumination device, etc.; a dental material; and the like.

For example, there is proposed a method in which in an image display device, an air gap between a transparent protective plate or an information input device (for example, a touch panel, etc.) and a display surface of an image display unit, or an air gap between a transparent protective plate and an information input device, is displaced with a transparent material having a refractive index closer to that of the transparent protective plate, the information input device, and the display surface of the image display unit than that of air, thereby enhancing the transmittance and suppressing a lowering of the luminance or contrast of the image display device. Then, it is proposed to use an adhesive which is cured by ultraviolet rays or visible rays as this transparent material (for example, JP-A-2008-83491). An example of a diagrammatic view of a liquid crystal display device as this image display device is shown in FIG. 1. A liquid crystal display device with a built-in touch panel is configured of a transparent protective plate (glass or plastic base material) 1, a touch panel 2, a polarizing plate 3, and a liquid crystal display cell 4. For the purposes of preventing the breakage of the liquid crystal display device, relaxing the stress and impact, and enhancing the visibility, there may be the case where a pressure-sensitive adhesive layer 5 is provided between the transparent protective plate 1 and the touch panel 2, and a pressure-sensitive adhesive layer 6 is further provided between the touch panel 2 and the polarizing plate 3.

As the photocurable resin composition, those in a liquid form or film form are known.

For example, JP-A-2009-1654 discloses a photocuring type transparent adhesive composition containing a urethane (meth)acrylate (A) having two or more functional groups having an unsaturated double bond, a monomer (B) having one functional group having an unsaturated double bond, a photopolymerization initiator (C), and a polythiol compound (D) having two or more thiol groups.

In addition, JP-A-2011-74308 discloses a transparent pressure-sensitive adhesive sheet composed of a photocurable resin composition containing a copolymer of a monomer component containing an alkyl (meth)acrylate in which the alkyl group has a carbon number of from 4 to 18, and the like.

Now, as a technology for gelling an oil, the addition of an oil gelling agent to the oil is carried out. The oil gelling agent is characterized in that the molecule forms a network in the oil, thereby achieving thickening. It is possible to gel the oil by dispersing a low-molecular weight oil gelling agent in the oil under heating conditions and cooling the dispersion to room temperature.

PRIOR ART

Patent Literature

Patent Document 1: JP2008-83491A
Patent Document 2: JP2009-1654A
Patent Document 3: JP2011-74308A

SUMMARY OF THE INVENTION

Problem to be Solved by the Invention

When the photocurable resin composition is in a liquid form as in JP-A-2009-1654 or the like, at the time of forming in a prescribed place, there is involved such a problem that the photocurable resin composition is liable to leak out from the subject prescribed place.

On the other hand, when the photocurable resin composition is in a sheet form (solid form) as in JP-A-2011-74308, though the problem of leakage is not caused, there is involved such a problem that the photocurable resin composition does not sufficiently deform after the shape of a prescribed place, thereby likely generating an air gap or the like in the subject prescribed place.

An object of the present invention is to solve the foregoing problems and to provide a photocurable resin composition which hardly causes leakage and is easily formed into a desired shape, an image display device using this photocurable resin composition, and a method for manufacturing the same.

The present invention provides the following [1] to [11].

[1] A photocurable resin composition containing a compound (A) having a photopolymerizable functional group and an oil gelling agent (B).

[2] The photocurable resin composition as set forth in [1], wherein the oil gelling agent (B) is at least one member of a hydroxy fatty acid, dextrin ester of fatty acid, n-lauroyl-L-glutamic acid-α,β-dibutylamide, di-p-methylbenzylidene sorbitol glucitol, 1,3:2,4-bis-O-benzylidene-D-glucitol, 1,3:2,4-bis-O-(4-methylbenzylidene)-D-sorbitol, bis(2-ethylhexanoato)hydroxyaluminum, and compounds represented by the following general formulae (1) to (12).

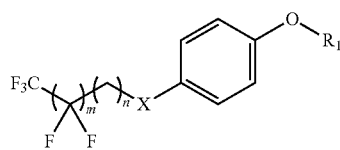

(1)

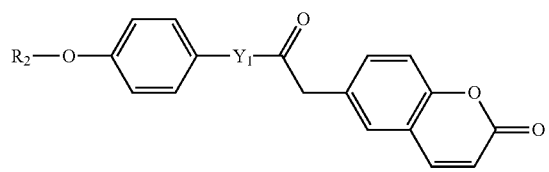

(2)

-continued

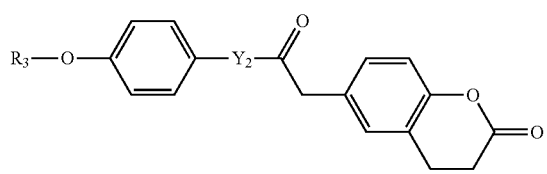
(3)

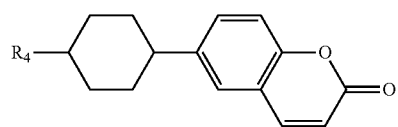
(4)

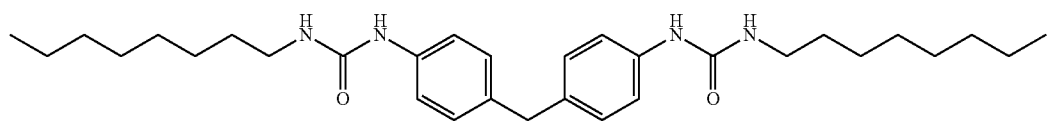
(5)

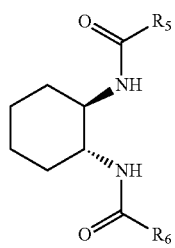
(6)

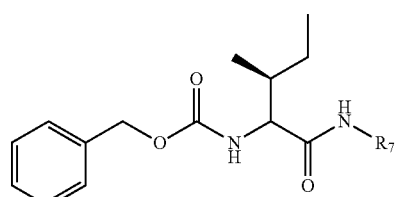
(7)

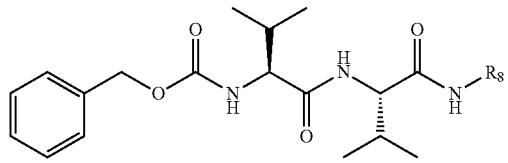
(8)

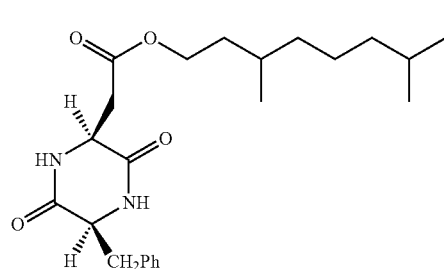
(9)

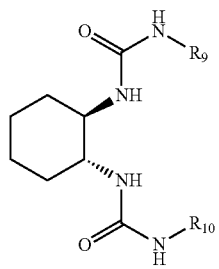
(10)

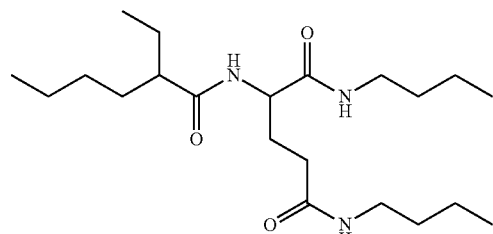
(11)

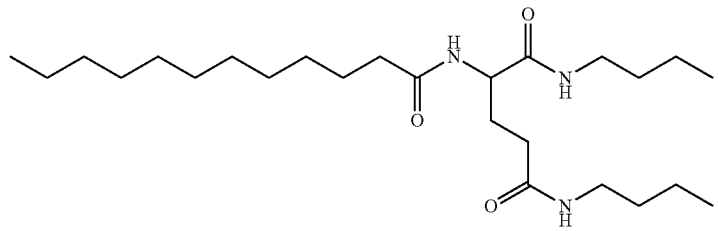
(12)

(In the genera formula (1), m is an integer of from 3 to 10; n is an integer of from 2 to 6; $R_1$ is a saturated hydrocarbon group having a carbon number of from 1 to 20; and X is sulfur or oxygen.

In the general formula (2), $R_2$ is a saturated hydrocarbon group having a carbon number of from 1 to 20; and $Y_1$ is a bond or a benzene ring.

In the general formula (3), $R_3$ is a saturated hydrocarbon group having a carbon number of from 1 to 20; and $Y_2$ is a bond or a benzene ring.

In the general formula (4), $R_4$ is a saturated hydrocarbon group having a carbon number of from 1 to 20.

In the general formula (6), $R_5$ and $R_6$ are each independently a saturated hydrocarbon group having a carbon number of from 1 to 20.

In the general formula (7), $R_7$ is a saturated hydrocarbon group having a carbon number of from 1 to 20.

In the general formula (8), $R_8$ is a saturated hydrocarbon group having a carbon number of from 1 to 20.

In the general formula (10), $R_9$ and $R_{10}$ are each independently a saturated hydrocarbon group having a carbon number of from 1 to 20.)

[3] The photocurable resin composition as set forth in [1] or [2], wherein the compound (A) having a photopolymerizable functional group includes a compound having an ethylenically unsaturated group.

[4] The photocurable resin composition as set forth in any one of [1] to [3], further containing a photopolymerization initiator (C).

[5] The photocurable resin composition as set forth in any one of [1] to [4], further containing a compound (D) which is liquid at 25° C.

[6] The photocurable resin composition as set forth in any one of [1] to [5], further containing a compound (E) which is solid at 25° C.

[7] An image display device having a laminate structure including an image display unit having an image display part, a transparent protective plate, and a resin layer existent between the image display unit and the transparent protective plate, wherein the resin layer is a cured material of the photocurable resin composition as set forth in any one of [1] to [6].

[8] An image display device having a laminate structure including an image display unit having an image display part, a touch panel, a transparent protective plate, and a resin layer existent between the touch panel and the transparent protective plate, wherein the resin layer is a cured material of the photocurable resin composition as set forth in any one of [1] to [6].

[9] The image display device as set forth in [7] or [8], wherein the transparent protective plate has a level difference part.

[10] A method for manufacturing an image display device comprising allowing a photocurable resin composition to intervene in a gap between an image display unit having an image display part or a touch panel and a transparent protective plate and curing the photocurable resin composition, wherein the photocurable resin composition as set forth in any one of [1] to [6] is allowed to intervene in the gap and cured upon irradiation with light from the side of the transparent protective plate.

[11] The method for manufacturing an image display device as set forth in [10], wherein the transparent protective plate has a level difference part.

Effect of the Invention

According to the present invention, it is possible to provide a photocurable resin composition which hardly causes leakage and is easily formed into a desired shape, an image display device using this photocurable resin composition, and a method for manufacturing the same.

BRIEF DESCRIPTION OF THE DRAWINGS

FIG. 8 is a graph showing evaluation results of Examples using a polymer having a (meth)acryloyl group as the component (A).

FIG. 9 is a graph showing evaluation results of Reference Examples using the component (D).

DETAILED DESCRIPTION OF THE INVENTION

[Photocurable Resin Composition]

Figure 1:
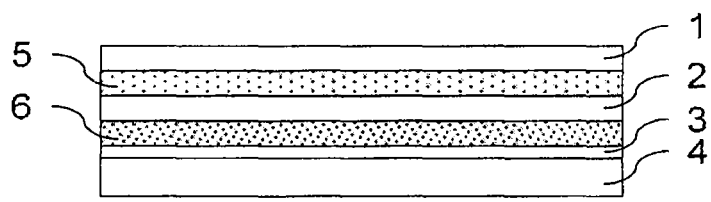
FIG. 1 is a diagrammatic view showing a cross-sectional structure of an example of an image display device.

The photocurable resin composition according to the present invention contains a compound (A) having a photopolymerizable functional group and an oil gelling agent (B).

The photocurable resin composition according to the present invention hardly causes leakage and is easily formed into a desired shape. Though details of the reason for this are not elucidated yet, they may be supposed as follows.

In the compound (A) having a photopolymerizable functional group, the oil gelling agent (B) which is contained in the photocurable resin composition reveals a noncovalent intermolecular interaction such as hydrogen bond, electrostatic bond, $\pi$-$\pi$ interaction, van der Waals forces, etc. and is mutually connected to form a fibrous conjugate (hereinafter also referred to as "self-organization"). According to this, at least a part of the photocurable resin composition becomes a material in a physical gel form at room temperature of 25° C. (hereinafter also referred to as "gelled" or "gel form"). As a result, it may be supposed that the photocurable resin composition according to the present invention hardly causes leakage as compared with a liquid and is easily formed into a desired shape as compared with a solid.

Next, each of the components of the photocurable resin composition is described.

<Compound (A) Having a Photopolymerizable Functional Group>

The compound (A) having a polymerizable functional group (hereinafter also referred to as "component (A)") is not particularly limited so far as it is photocurable. A compound containing an ethylenically unsaturated group, which is curable with a photopolymerization initiator capable of generating a radical, such as a (meth)acryloyl group, a vinyl group, an allyl group, etc.; a compound containing a cyclic ether group, which is curable with a photo acid generator capable of generating an acid, such as an epoxy group, etc.; and the like are preferable. However, from the standpoints of curability and transparency, a compound containing an ethylenically unsaturated group is preferable, and a compound containing a (meth)acryloyl group is more preferable.

As the compound containing an ethylenically unsaturated group, a (meth)acrylate compound, a polymer having a (meth)acryloyl group, a compound having a vinyl group, a compound having an allyl group, and the like are suitable. Next, these compounds and polymers are described in this order.

Incidentally, in the present specification, the term "(meth)acrylate" means an "acrylate" and a corresponding "methacrylate". Similarly, the term "(meth)acryl" means an "acryl" and a corresponding "methacryl", and the term "(meth)acryloyl" means an "acryloyl" and a corresponding "methacryloyl".

((Meth)Acrylate Compound)

Examples of the (meth)acrylate compound include (meth)acrylic acid; (meth)acrylic acid amide; (meth)acryloyl morpholine; an alkyl (meth)acrylate in which the alkyl group has a carbon number of from 1 to 18, such as methyl (meth)acrylate, ethyl (meth)acrylate, n-butyl (meth)acrylate, isobutyl (meth)acrylate, tert-butyl (meth)acrylate, n-pentyl (meth)acrylate, n-hexyl (meth)acrylate, n-octyl (meth)acrylate, isooctyl (meth)acrylate, 2-ethylhexyl (meth)acrylate, isodecyl (meth)acrylate, dodecyl (meth)acrylate (n-lauryl (meth)acrylate), isomyristyl (meth)acrylate, stearyl (meth)acrylate, etc.; an alkanediol di(meth)acrylate in which the alkane has a carbon number of from 1 to 18, such as ethylene glycol di(meth)acrylate, butanediol (meth)acrylate, nonanediol di(meth)acrylate, etc.; a polyfunctional (meth)acrylate having three or more (meth)acryloyl groups in the molecule thereof, such as trimethylolpropane tri(meth)acrylate, tetramethylolmethane tri(meth)acrylate, tetramethylolmethane tetra(meth)acrylate, dipentaerythritol penta(meth)acrylate, dipentaerythritol hexa(meth)acrylate, etc.; glycidyl methacrylate; an alkenyl (meth)acrylate in which the alkenyl group has a carbon number of from 2 to 18, such as 3-butenyl (meth)acrylate, etc.; a (meth)acrylate having an aromatic ring, such as benzyl (meth)acrylate, phenoxyethyl (meth)acrylate, etc.; an alkoxypolyalkylene glycol (meth)acrylate such as methoxytetraethylene glycol (meth)acrylate, methoxyhexaethylene glycol (meth)acrylate, methoxyoctaethylene glycol (meth)acrylate, methoxynonaethylene glycol (meth)acrylate, methoxypolyethylene glycol (meth)acrylate, methoxyheptapropylene glycol (meth)acrylate, ethoxytetraethylene glycol (meth)acrylate, butoxyethylene glycol (meth)acrylate, butoxydiethylene glycol (meth)acrylate, etc.; a (meth)acrylate having an alicyclic group, such as cyclohexyl (meth)acrylate, isobornyl (meth)acrylate, dicyclopentanyl (meth)acrylate, etc.; a (meth)acrylate having a hydroxyl group, such as 2-hydroxyethyl (meth)acrylate, 3-hydroxypropyl (meth)acrylate, 4-hydroxybutyl (meth)acrylate, etc.; tetrahydrofurfuryl (meth)acrylate; a (meth)acrylamide derivative such as N,N-dimethylaminoethyl (meth)acrylate, N,N-dimethylaminopropyl (meth)acrylamide, N,N-dimethyl (meth)acrylamide, N-isopropyl (meth)acrylamide, N,N-diethyl (meth)acrylamide, N-hydroxyethyl (meth)acrylamide, etc.; a (meth)acrylate having an isocyanate group, such as 2-(2-methacryloyloxyethyloxy)ethyl isocyanate, 2-(meth)acryloyloxyethyl isocyanate, etc.; a polyalkylene glycol mono(meth)acrylate such as tetraethylene glycol mono (meth)acrylate, hexaethylene glycol mono(meth)acrylate, octapropylene glycol mono(meth)acrylate, dipropylene glycol mono(meth)acrylate, tripropylene glycol mono(meth)acrylate, octapropylene glycol mono(meth)acrylate, etc.; a polyalkylene glycol di(meth)acrylate; a (meth)acrylate having an isocyanuric ring skeleton; a (meth)acrylate having a siloxane skeleton; and the like. These may be used alone or in combination of two or more kinds thereof.

Incidentally, there may be the case where the alkyl (meth)acrylate in which the alkyl group has a carbon number of from 1 to 18, the alkanediol di(meth)acrylate in which the alkane has a carbon number of from 1 to 18, the polyfunctional (meth)acrylate having three or more (meth)acryloyl groups in the molecule thereof, the glycidyl methacrylate, and the alkenyl (meth)acrylate in which the alkenyl group has a carbon number of from 2 to are generically named an "aliphatic (meth)acrylate". In addition, there may be the case where the alkoxy polyalkylene glycol (meth)acrylate, the polyalkylene glycol mono(meth)acrylate, the polyalkylene glycol di(meth)acrylate, the (meth)acrylate having an isocyanuric ring skeleton, and the (meth)acrylate having a siloxane skeleton are generically named a "heteroatom-based (meth)acrylate".

[Aliphatic (Meth)Acrylate]

Specifically, as the aliphatic (meth)acrylate, those represented by the following general formulae (13) to (23) are suitable.

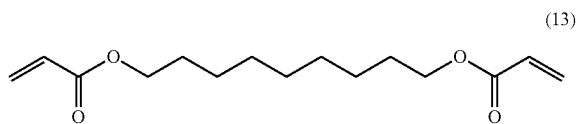

(13)

The compound of the general formula (13) is commercially available as, for example, FA-129AS (a trade name manufactured by Hitachi Chemical Co., Ltd.).

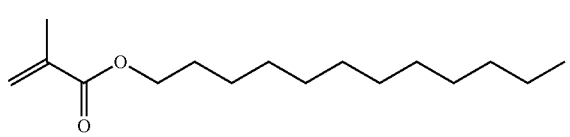

(14)

The compound of the general formula (14) is commercially available as, for example, LIGHT ESTER L (a trade name for lauryl methacrylate, manufactured by Kyoeisha Chemical Co., Ltd.) and is also commercially available as FA-112M (a trade name manufactured by Hitachi Chemical Co., Ltd.).

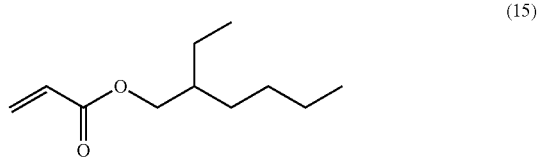

(15)

The compound of the general formula (15) is 2-ethylhexyl acrylate (ERA), is commercially available from, for example, Wako Pure Chemical Industries, Ltd., and is also commercially available as 2-ethylhexyl acrylate from Nippon Shokubai Co., Ltd.

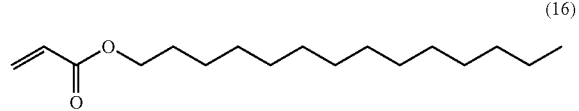

(16)

The compound of the general formula (16) is commercially available as, for example, LIGHT ACRYLATE IM-A (a trade name for isomyristyl acrylate (isomer mixture of C14), manufactured by Kyoeisha Chemical Co., Ltd.).

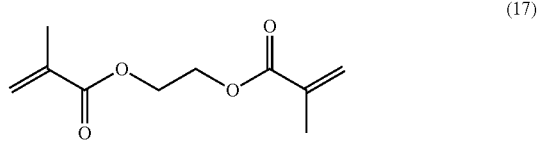

(17)

The compound of the general formula (17) is commercially available as, for example, FA-121M (a trade name manufactured by Hitachi Chemical Co., Ltd.).

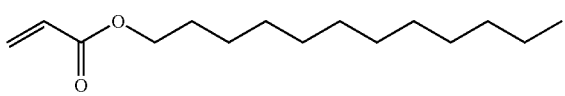
(18)

The compound of the general formula (18) is commercially available as, for example, FA-112A (a trade name manufactured by Hitachi Chemical Co., Ltd.).

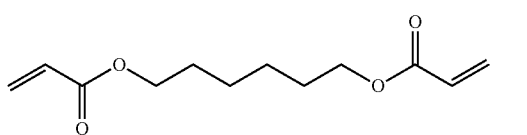
(19)

The compound of the general formula (19) is commercially available as, for example, FA-126AS (a trade name manufactured by Hitachi Chemical Co., Ltd.).

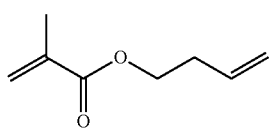
(20)

The compound of the general formula (20) is commercially available as, for example, VBMA (a name of an article made on an experimental basis, manufactured by Hitachi Chemical Co., Ltd.).

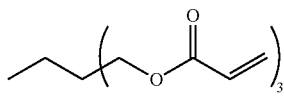
(21)

The compound of the general formula (21) is commercially available as, for example, LIGHT ACRYLATE TMP-A (a trade name manufactured by Kyoeisha Chemical Co., Ltd.).

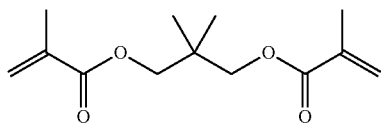
(22)

The compound of the general formula (22) is commercially available as, for example, FA-125M (a trade name manufactured by Hitachi Chemical Co., Ltd.).

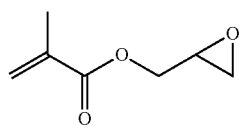
(23)

The compound of the general formula (23) is commercially available as, for example, LIGHT ESTER G (a trade name manufactured by Kyoeisha Chemical Co., Ltd.) (also referred to as "GMA").

Among the foregoing compounds, from the viewpoint of transparency, the compounds of the general formulae (13) to (19) are preferable.

From the viewpoint of gelation (self-organization), the compounds of the general formulae (13) to (18) and (20) to (22) are preferable, and the compounds of the general formulae (13) to (16) are more preferable.

From the viewpoint of step height covering properties, all of the compounds of the general formulae (13) to (23) are preferable.

Incidentally, details of the step height covering properties are those described in the Examples.

From the viewpoint of low curing shrinkage ratio, the compounds of the general formulae (13) to (16), (18), and (19) are preferable, and the compounds of the general formulae (13) to (16) and (18) are more preferable. If the compound has a low curing shrinkage ratio, a change of the dimension before and after the photocuring is small, and a cured material with good dimensional precision can be obtained.

From the viewpoint of low dielectric constant, the compounds of the general formulae (13) to (16), (18), and (19) are preferable, and the compounds of the general formulae (13) to (16) and (18) are more preferable. If the compound has a low dielectric constant, when the photocurable resin composition is used in, for example, filling an air gap of a touch panel, a malfunction can be suppressed.

[(Meth)Acrylate Having an Aromatic Ring]

As the (meth)acrylate having an aromatic ring, one or two or more kinds of compounds represented by the following formulae (a) to (c) and benzyl (meth)acrylate are suitably exemplified.

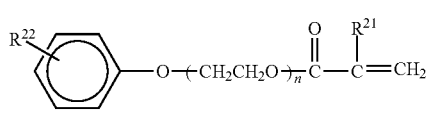
(a)

(In the general formula (a), $R^{21}$ represents a hydrogen atom or a methyl group; $R^{22}$ represents a hydrogen atom, an alkyl group having a carbon number of from 1 to 12, or a phenyl group; and n represents an integer of from 1 to 20.)

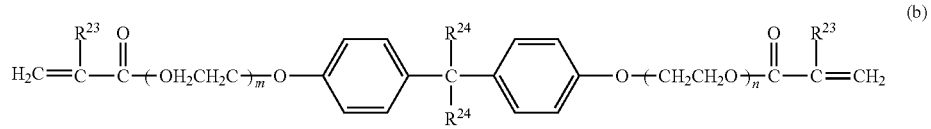
(b)

(In the general formula (b), $R^{23}$ represents a hydrogen atom or a methyl group; $R^{24}$ represents a hydrogen atom or a methyl group; and m and n each independently represent an integer of from 1 to 20.)

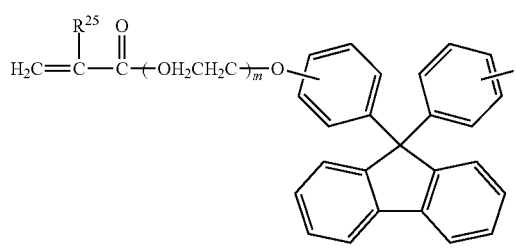

(c)

(In the general formula (c), $R^{25}$ represents a hydrogen atom or a methyl group; and m and n each independently represent an integer of from 1 to 20.)

Specifically, as the (meth)acrylate having an aromatic ring, those represented by the following general formulae (24) to (36) are suitable.

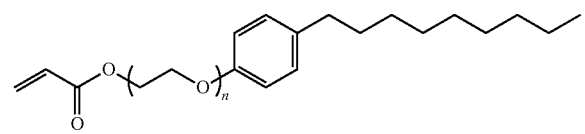

(24)

(In the general formula (24), an average value of n is 4.)

The compound of the general formula (24) is commercially available as, for example, FA-314A (a trade name manufactured by Hitachi Chemical Co., Ltd.).

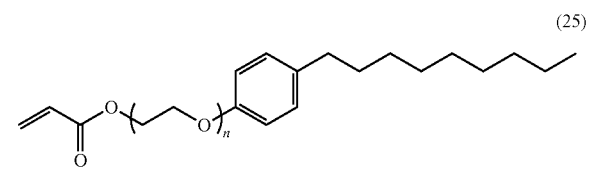

(25)

(In the general formula (25), an average value of n is 8.)

The compound of the general formula (25) is commercially available as, for example, FA-38A (a trade name manufactured by Hitachi Chemical Co., Ltd.).

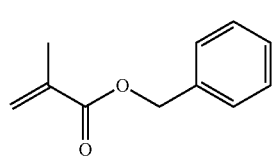

(26)

The compound of the general formula (26) is commercially available as, for example, FA-BZM (a trade name manufactured by Hitachi Chemical Co., Ltd.).

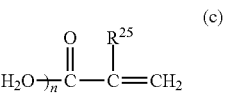

(27)

The compound of the general formula (27) is commercially available as, for example, FA-BZA (a trade name manufactured by Hitachi Chemical Co., Ltd.).

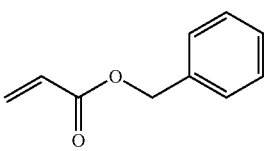

(28)

(In the general formula (28), an average value of (m+n) is 10.)

The compound of the general formula (28) is commercially available as, for example, FA-321A (a trade name manufactured by Hitachi Chemical Co., Ltd.).

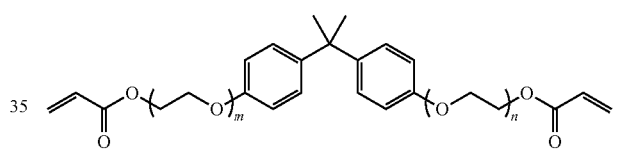

(29)

(In the general formula (29), an average value of (m+n) is 18.)

The compound of the general formula (29) is commercially available as, for example, FA-3218M (a trade name manufactured by Hitachi Chemical Co., Ltd.).

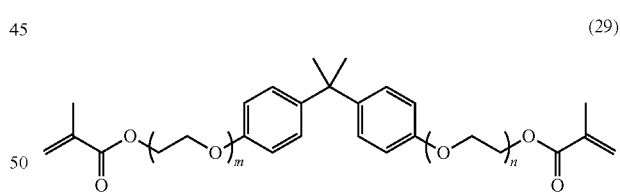

(30)

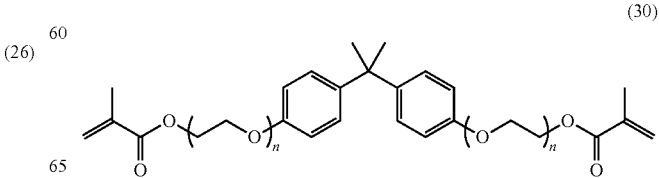

(In the general formula (30), an average value of (m n) is 10.)

The compound of the general formula (30) is commercially available as, for example, FA-321M (a trade name manufactured by Hitachi Chemical Co., Ltd.).

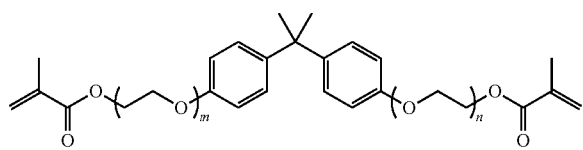
(31)

(In the general formula (31), an average value of (m n) is 30.)

The compound of the general formula (31) is commercially available as, for example, FA-323M (a trade name manufactured by Hitachi Chemical Co., Ltd.).

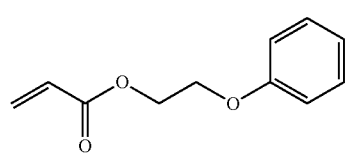
(32)

The compound of the general formula (32) is commercially available as, for example, LIGHT ACRYLATE PO-A (a trade name manufactured by Kyoeisha Chemical Co., Ltd.).

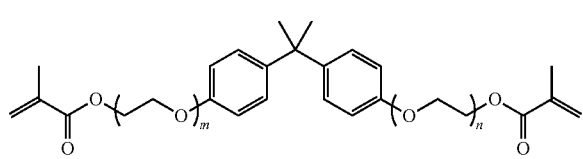
(33)

(In the general formula (33), an average value of (m n) is 4.)

The compound of the general formula (33) is commercially available as, for example, FA-324M (a trade name manufactured by Hitachi Chemical Co., Ltd.).

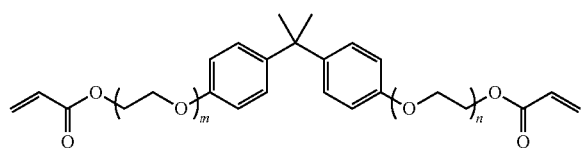
(34)

(In the general formula (34), an average value of (m n) is 4.)

The compound of the general formula (34) is commercially available as, for example, FA-324A (a trade name manufactured by Hitachi Chemical Co., Ltd.).

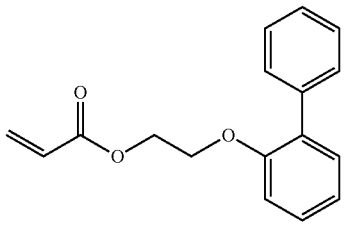
(35)

The compound of the general formula (35) is commercially available as, for example, FA-302A (a trade name manufactured by Hitachi Chemical Co., Ltd.).

(36)

The compound of the general formula (36) is commercially available as, for example, A-BPFE (a trade name manufactured by Shin-Nakamura Chemical Co., Ltd.).

Among the foregoing compounds, from the viewpoint of transparency, the compounds of the general formulae (24) to (32) are preferable, the compounds of the general formulae (24) to (31) are more preferable, and the compounds of the general formulae (24) to (27) are still more preferable.

From the viewpoint of gelation (self-organization), the compounds of the general formulae (24) to (25) and (28) to (36) are preferable, and the compounds of the general formulae (24), (28), (29), and (33) to (36) are more preferable.

From the viewpoint of step height covering properties, all of the compounds of the general formulae (24) to (36) are preferable.

From the viewpoint of low curing shrinkage ratio, the compounds of the general formulae (24), (25), (28) to (31), (35), and (36) are preferable, and the compounds of the general formulae (24), (28), and (36) are more preferable.

From the viewpoint of low dielectric constant, the compounds of the general formulae (24), (25), (28) to (31), (35), and (36) are preferable, and the compounds of the general formulae (24), (28), and (36) are more preferable.

[(Meth)Acrylate Having an Alicyclic Group]

Specifically, as the (meth)acrylate having an alicyclic group, those represented by the following general formulae (37) to (43) are suitable.

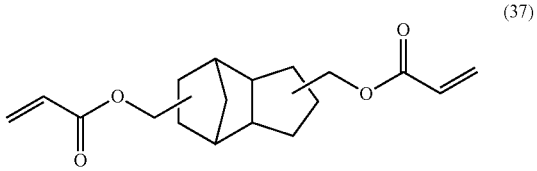
(37)

The compound of the general formula (37) is commercially available as, for example, LIGHT ACRYLATE DCP-A (a trade name for dimethylol tricyclodecane diacrylate, manufactured by Kyoeisha Chemical Co., Ltd.).

(38)

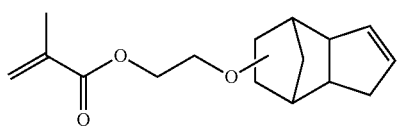

The compound of the general formula (38) is commercially available as, for example, FA-512M (a trade name manufactured by Hitachi Chemical Co., Ltd.).

(39)

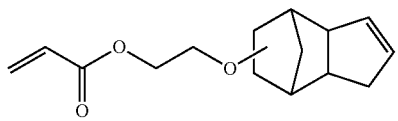

The compound of the general formula (39) is commercially available as, for example, FA-512AS (a trade name manufactured by Hitachi Chemical Co., Ltd.).

(40)

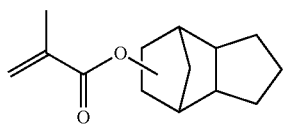

The compound of the general formula (40) is commercially available as, for example, FA-513M (a trade name manufactured by Hitachi Chemical Co., Ltd.).

(41)

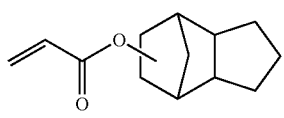

The compound of the general formula (41) is commercially available as, for example, FA-513AS (a trade name manufactured by Hitachi Chemical Co., Ltd.).

(42)

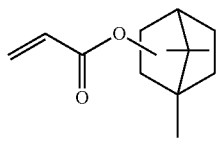

The compound of the general formula (42) is commercially available as, for example, LIGHT ACRYLATE IB-XA (a trade name for isobornyl acrylate, manufactured by Kyoeisha Chemical Co., Ltd.).

(43)

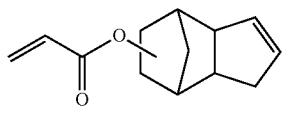

The compound of the general formula (43) is commercially available as, for example, FA-511AS (a trade name manufactured by Hitachi Chemical Co., Ltd.).

All of the compounds of the general formulae (37) to (43) are extremely excellent in the transparency.

From the viewpoint of gelation (self-organization), the compounds of the general formulae (37) and (38) are more preferable.

From the viewpoint of step height covering properties, all of the compounds of the general formulae (37) to (43) are preferable.

From the viewpoint of low curing shrinkage ratio, the compounds of the general formulae (37) to (43) are preferable, and the compounds of the general formulae (38) to (43) are more preferable.

From the viewpoint of low dielectric constant, the compounds of the general formulae (37) to (43) are preferable, and the compounds of the general formulae (38) to (43) are more preferable.

[Heteroatom-Based (Meth)Acrylate]

The heteroatom-based (meth)acrylate as referred to in the present invention is classified as a (meth)acrylate not containing an aromatic ring and containing a lot of heteroatoms.

As the heteroatom-based (meth)acrylate, one or two or more kinds of a polyalkylene glycol di(meth)acrylate represented by the following formula (d), an alkoxy polyalkylene glycol (meth)acrylate and a polyalkylene glycol mono(meth) acrylate represented by the following formula (e), a (meth) acrylate having an isocyanuric ring skeleton, and a (meth) acrylate having a siloxane skeleton are suitably exemplified.

(d)

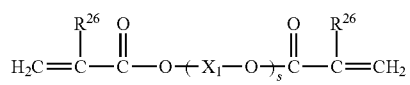

(In the general formula (d), represents a hydrogen atom or a methyl group; $X_1$ represents an ethylene group, a propylene group, or an isopropylene group; and s represents an integer of from 2 to 20.)

(e)

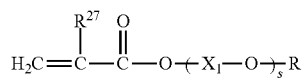

(In the general formula (e), R represents an alkyl group having a carbon number of from 1 to 5; $R^{27}$ represents a hydrogen atom or a methyl group; $X_1$ represents an ethylene group, a propylene group, or an isopropylene group; and s represents an integer of from 2 to 20.)

Specifically, as the heteroatom-based (meth)acrylate, those represented by the following general formulae (44) to (49) are suitable.

(44)

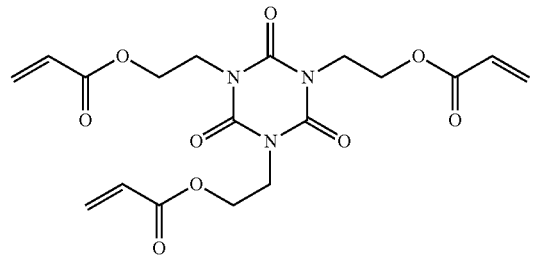

The compound of the general formula (44) is commercially available as, for example, FA-731A (a trade name manufactured by Hitachi Chemical Co., Ltd.).

(45)

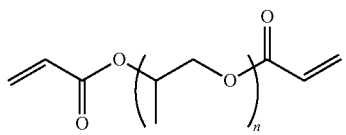

(In the general formula (45), an average value of n is 7.)

The compound of the general formula (45) is commercially available as, for example, FA-P240A (a trade name manufactured by Hitachi Chemical Co., Ltd.).

(46)

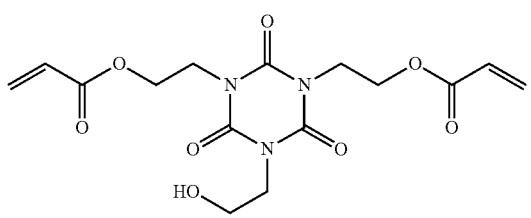

The compound of the general formula (46) is commercially available as, for example, FA-731AT (a trade name manufactured by Hitachi Chemical Co., Ltd.).

(47)

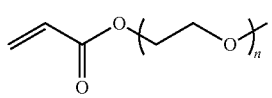

(In the general formula (47), an average value of n is 9.)

The compound of the general formula (47) is commercially available as, for example, LIGHT ACRYLATE 130A (a trade name manufactured by Kyoeisha Chemical Co., Ltd.).

(48)

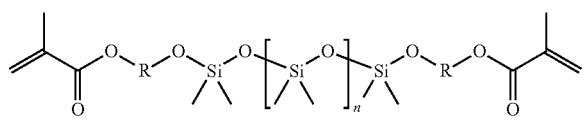

The compound of the general formula (48) is commercially available as, for example, X-22-164AS (a trade name manufactured by Shin-Etsu Chemical Co., Ltd.).

(49)

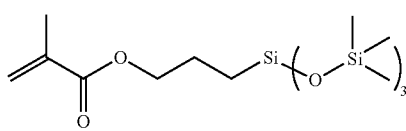

The compound of the general formula (49) is commercially available as, for example, SILAPLANE TM-0701 (a trade name manufactured by JNC Corporation) (chemical name: 3-tris(trimethylsiloxy)silylpropyl methacrylate) (hereinafter also referred to as "TRIS").

Among the foregoing compounds, from the viewpoint of transparency, the compounds of the general formulae (44) and (45) are preferable.

From the viewpoint of gelation (self-organization), the compounds of the general formulae (44), and (46) to (49) are preferable, and the compounds of the general formulae (46) to (49) are more preferable.

From the viewpoint of step height covering properties, all of the compounds of the general formulae (44) to (49) are preferable.

From the viewpoint of low curing shrinkage ratio, the compounds of the general formulae (46), (48), and (49) are preferable, and the compound of the general formula (48) is more preferable.

From the viewpoint of low dielectric constant, the compounds of the general formulae (46), (48), and (49) are preferable, and the compound of the general formula (48) is more preferable.

(Polymer Having a (Meth)Acryloyl Group)

Examples of the polymer having a (meth)acryloyl group include polybutadiene (meth)acrylate, polyisoprene (meth)acrylate, urethane acrylate, epoxy acrylate, an acrylic resin having a (meth)acryloyl group in a side chain thereof, and a modified material thereof. These may be used alone or in combination of two or more kinds thereof.

Specifically, as the polymer having a (meth)acryloyl group, those represented by the following general formulae (50) to (52) are suitable.

(50)

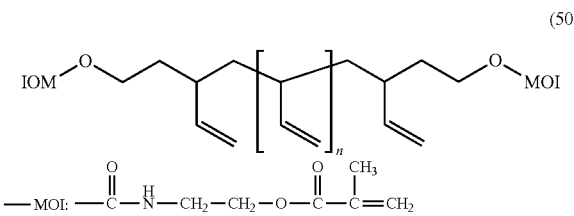
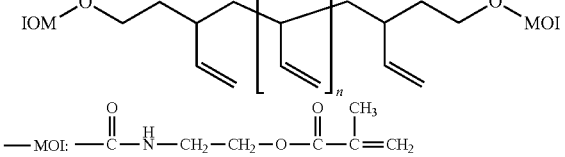
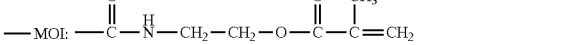

The compound of the general formula (50) can be, for example, obtained by allowing G-3000 (a trade name for α,ω-polybutadiene glycol, manufactured by Nippon Soda Co., Ltd.) to react with KARENZ MOI (a trade name for 2-isocyanatoethyl methacrylate, manufactured by Showa Denko K.K.) (hereinafter also referred to as "PB-MOI").

(51)

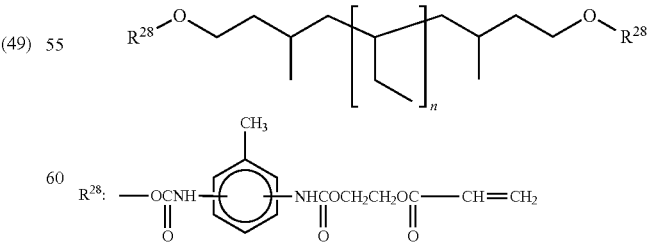

The compound of the general formula (51) is commercially available as, for example, TEAI-1000 (a trade name manufactured by Nippon Soda Co., Ltd.).

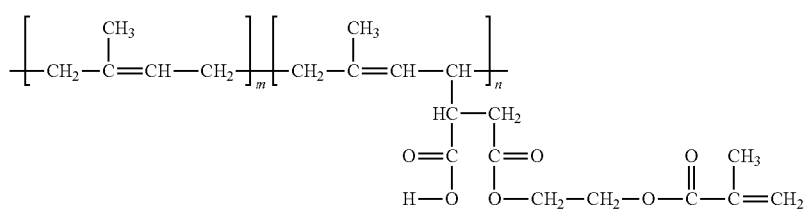

(52)

The compound of the general formula (52) is commercially available as, for example, UC-203 (manufactured by Kuraray Co., Ltd., n=3, number average molecular weight: 35,000) having a structure represented by UC-102 (manufactured by Kuraray Co., Ltd., n=2, number average molecular weight: 17,000).

All of the compounds of the general formulae (50) to (52) are very excellent in all of transparency, gelation (self-organization) performance, and low dielectric constant.

From the viewpoint of step height covering properties, all of the compounds of the general formulae (50) to (52) are excellent.

From the viewpoint of low curing shrinkage ratio, the compounds of the general formulae (50) and (52) are preferable.

(Compound Having a Vinyl Group and Compound Having an Allyl Group)

Examples of the compound having a vinyl group and the compound having an allyl group include styrene, divinylbenzene, vinylpyrrolidone, triallyl isocyanurate, 1,2-polybutadiene, and the like. These may be used alone or in combination of two or more kinds thereof.

Specifically, as the compound having a vinyl group and the compound having an allyl group, those represented by the following general formulae (53) to (55) are suitable.

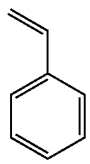

(53)

The compound of the general formula (53) is STC (styrene) and is commercially available from, for example, Wako Pure Chemical Industries, Ltd.

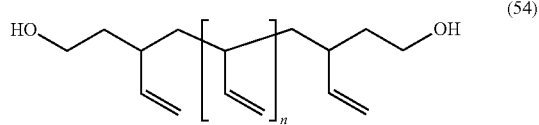

(54)

The compound of the general formula (54) is commercially available as RICON 130 and RICON 131 (all of which are a trade name for polybutadiene mainly composed of a 1,2-structural unit, manufactured by Cray Valley).

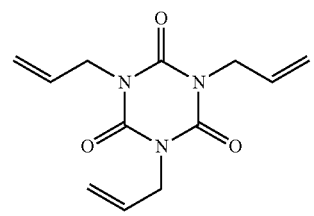

(55)

The compound of the general formula (55) is commercially available as, for example, TAIC (a trade name manufactured by Nippon Kasei Chemical Co., Ltd.).

Among the foregoing compounds, from the viewpoints of transparency, gelation (self-organization), and step height covering properties, all of the compounds are more preferable.

From the viewpoint of low curing shrinkage ratio, the compound of the general formula (54) is preferable.

From the viewpoint of low dielectric constant, the compounds of the general formulae (54) and (55) are preferable.

(Content of the Compound (A) Having a Photopolymerizable Functional Group)

The content of the compound (A) having a photopolymerizable functional group is preferably from 0.5 to 99% by mass relative to the whole amount of the photocurable resin composition. When the content of the compound (A) having a photopolymerizable functional group is 0.5% by mass or more, the photocuring can be sufficiently achieved, whereas when it is not more than 99% by mass, the content of the oil gelling agent becomes relatively large, so that the gelation can be sufficiently achieved. From this viewpoint, the content of the compound (A) having a photopolymerizable functional group is more preferably from 1 to 90% by mass, and still more preferably from 2 to 85% by mass.

<Oil Gelling Agent (B)>

Examples of the oil gelling agent (B) (hereinafter also referred to as "component (B)" include a hydroxy fatty acid such as a hydroxystearic acid, in particular, 12-hydroxystearic acid, etc., a dextrin ester of fatty acid such as dextrin ester of palmitic acid, etc., n-lauroyl-L-glutamic acid-α,β-dibutylamide, di-p-methylbenzylidene sorbitol glucitol, 1,3:2,4-bis-O-(4-methylbenzylidene)-D-sorbitol, bis(2-ethylhexanoato)hydroxyaluminum, compounds represented by the following general formulae (1) to (12), and the like. These may be used alone or in combination of two or more kinds thereof.

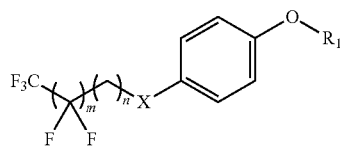

(1)

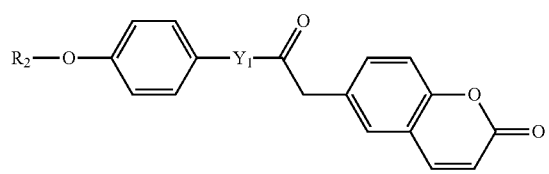

(2)

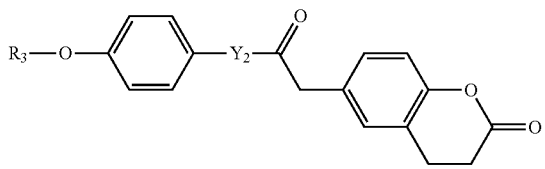
(3)

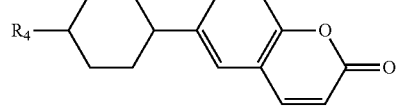
(4)

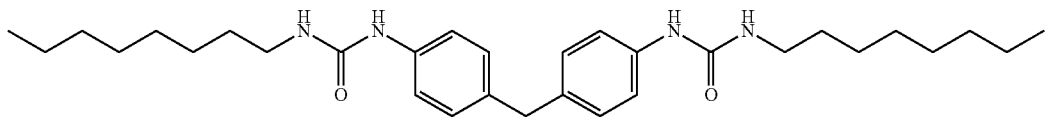
(5)

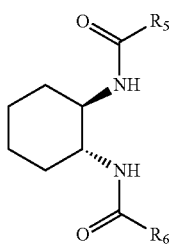
(6)

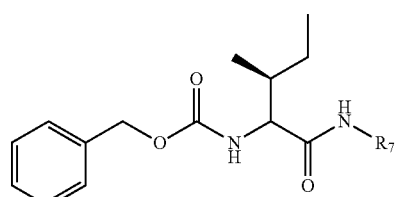
(7)

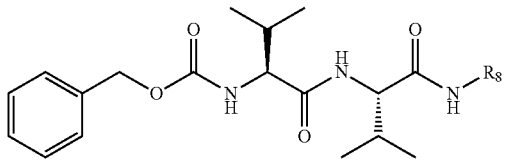
(8)

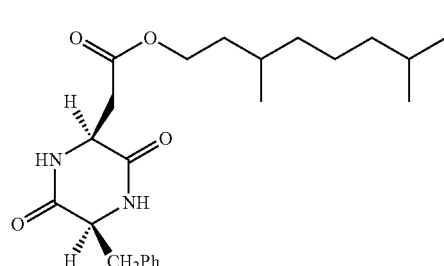
(9)

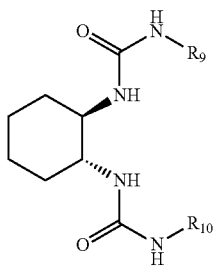
(10)

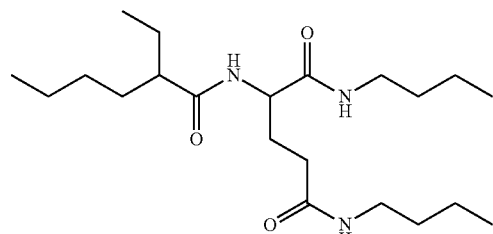
(11)

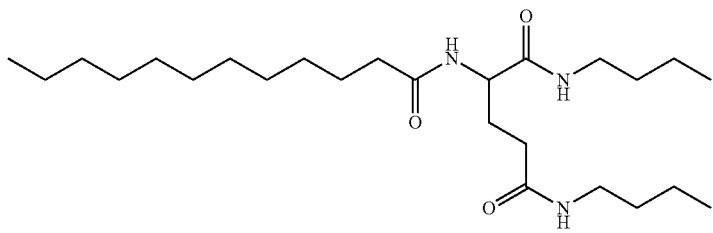
(12)

In the general formula (1), m is an integer of from 3 to 10; n is an integer of from 2 to 6; $R_1$ is a saturated hydrocarbon group having a carbon number of from 1 to 20; and X is sulfur or oxygen.

In the general formula (2), $R_2$ is a saturated hydrocarbon group having a carbon number of from 1 to 20; and $Y_1$ is a bond or a benzene ring.

In the general formula (3), $R_3$ is a saturated hydrocarbon group having a carbon number of from 1 to 20; and $Y_2$ is a bond or a benzene ring.

In the general formula (4), $R_4$ is a saturated hydrocarbon group having a carbon number of from 1 to 20.

In the general formula (6), $R_5$ and $R_6$ are each independently a saturated hydrocarbon group having a carbon number of from 1 to 20.

In the general formula (7), $R_7$ is a saturated hydrocarbon group having a carbon number of from 1 to 20.

In the general formula (8), $R_8$ is a saturated hydrocarbon group having a carbon number of from 1 to 20.

In the general formula (10), $R_9$ and $R_{10}$ are each independently a saturated hydrocarbon group having a carbon number of from 1 to 20.

The content of the oil gelling agent (B) is preferably from 0.1 to 20% by mass relative to the whole amount of the photocurable resin composition. When the content of the oil gelling agent (B) is 0.1% by mass or more, the gelation can be sufficiently achieved, whereas when it is not more than 20% by mass, the content of the compound (A) having a photopolymerizable functional group becomes relatively large, so that the photocuring can be sufficiently achieved. From this viewpoint, the content of the oil gelling agent (B) is more preferably from 0.2 to 15% by mass, and still more preferably from 0.3 to 10% by mass.

<Photopolymerization Initiator (C)>

Tt is preferable that the photocurable resin composition according to the present invention contains a photopolymerization initiator (C) (hereinafter also referred to as "component (C)"). According to this, after the material in a physical gel form containing the component (A) and the component (B) is formed into a prescribed shape, the component (A) can be three-dimensionally crosslinked, and the leakage can be more suppressed.

This photopolymerization initiator (C) allows the curing reaction to be advanced upon irradiation with active energy rays. The active energy rays as referred to herein mean ultraviolet rays, electron beams, α-rays, β-rays, γ-rays, or the like.

The photopolymerization initiator is not particularly limited, and it is possible to use a known material such as a benzophenone-based material, an anthraquinone-based material, a benzoyl-based material, a sulfonium salt, a diazonium salt, an onium salt, etc.

Specifically, examples thereof include an aromatic ketone compound such as benzophenone, N,N'-tetramethyl-4,4'-diaminobenzophenone (Michler's ketone), N,N-tetraethyl-4,4'-diaminobenzophenone, 4-methoxy-4,4'-dimethylaminobenzophenone, α-hydroxyisobutylphenone, 2-ethylanthraquinone, t-butylanthraquinone, 1,4-dimethylanthraquinone, 1-chloroanthraquinone, 2,3-dichloroanthraquinone, 3-chloro-2-methylanthraquinone, 1,2-benzoanthraquinone, 2-phenylanthraquinone, 1,4-naphthoquinone, 9,10-phenanthraquinone, thioxanthone, 2-chlorothioxanthone, 1-hydroxycyclohexyl phenyl ketone, 2,2-dimethoxy-1,2-diphenylethan-1-one, 2-hydroxy-2-methyl-1-phenylpropan-1-one, 2,2-diethoxyacetophenone, etc.; a benzoin compound such as benzoin, methyl benzoin, ethyl benzoin, etc.; a benzoin ether compound such as benzoin methyl ether, benzoin ethyl ether, benzoin isobutyl ether, benzoin phenyl ether, etc.; a benzil compound such as benzil, benzil dimethyl ketal, etc.; an acridine compound such as an ester compound of β-(acridin-9-yl)(meth)acrylic acid, 9-phenylacridine, 9-pyridylacridine, 1,7-diacridinoheptane, etc.; a 2,4,5-triarylimidazole dimer such as a 2-(o-chlorophenyl)-4,5-diphenylimidazole dimer, a 2-(o-chlorophenyl)-4,5-di(m-methoxyphenyl)imidazole dimer, a 2-(o-fluorophenyl)-4,5-diphenylimidazole dimer, a 2-(o-methoxyphenyl)-4,5-diphenylimidazole dimer, a 2-(p-methoxyphenyl)-4,5-diphenylimidazole dimer, a 2,4-di(p-methoxyphenyl)-5-phenylimidazole dimer, a 2-(2,4-dimethoxyphenyl)-4,5-diphenylimidazole dimer, a 2-(p-methylmercaptophenyl)-4,5-diphenylimidazole dimer, etc.; an α-aminoalkylphenone-based compound such as 2-benzyl-2-dimethylamino-1-(4-morpholinophenyl)-1-butanone, 2-methyl-1-[4-(methylthio)phenyl]-2-morpholino-1-propanone, etc.; an acyl phosphine oxide-based compound such as bis(2,4,6-trimethylbenzoyl)-phenylphosphine oxide, etc.; oligo(2-hydroxy-2-methyl-1-(4-(1-methylvinyl)phenyl)propanone); and the like.

In addition, in particular, an α-hydroxyalkylphenone-based compound such as 1-hydroxycyclohexyl phenyl ketone, 2-hydroxy-2-methyl-1-phenyl-propan-1-one, 1-[4-(2-hydroxyethoxy)-phenyl]-2-hydroxy-2-methyl-1-propan-1-one, etc.; an acyl phosphine oxide-based compound such as bis(2,4,6-trimethylbenzoyl)-phenylphosphine oxide, bis(2,6-dimethoxybenzoyl)-2,4,4-trimethyl-pentylphosphine oxide, 2,4,6-trimethylbenzoyl-diphenylphosphine oxide, etc.; oligo(2-hydroxy-2-methyl-1-(4-(1-methylvinyl)phenyl)propanone); and a combination thereof are preferable as the polymerization initiator which does not color the photocurable resin composition.

The content of the photopolymerization initiator (C) is preferably from 0.1 to 5% by mass, more preferably from 0.2 to 3% by mass, and still more preferably from 0.3 to 2% by mass relative to the whole amount of the photocurable resin composition. When the content of the photopolymerization initiator (C) is 0.1% by mass or more, the photopolymerization can be favorably initiated. When the content of the photopolymerization initiator (C) is not more than 5% by mass, the photocurable resin composition is excellent in the step height covering properties and self-organization properties, and a hue of the obtained cured material does not become yellowish.

<Compound (D) which is Liquid at 25° C.>

In addition, the photocurable resin composition according to the present invention may further contain a compound (D) which is liquid at 25° C. (hereinafter also referred to as "component (D)"). The compound (D) which is liquid at 25° C. may be added according to the purpose within the range where the self-organization properties are not impaired. Here, the compound which is liquid includes a compound having high viscosity.

Examples of the compound (D) which is liquid at 25° C. include di-2-ethylhexyl phthalate (DOP), di-n-octyl phthalate, diisononyl phthalate (DINP), diisodecyl phthalate (DIDP), diundecyl phthalate (the general formula (56), DUP), 1,4-bis(3-mercaptobutyryloxy)butane, 1,3,5-tris(3-mercaptobutyryloxyethyl)-1,3,5-triazine-2,4,6(1H,3H,5H)-trione, pentaerythritol tetrakis(3-mercaptobutyrate), liquid paraffin, an organic solvent, and the like.

(56)

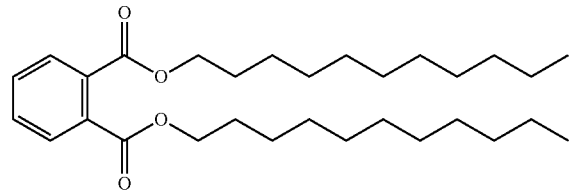

(57)

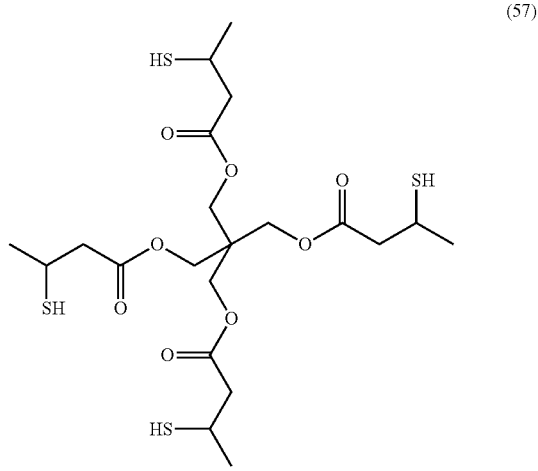

Incidentally, the pentaerythritol tetrakis(3-mercaptobutyrate) is commercially available as, for example, KARENZ MT PE1 (manufactured by Showa Denko K.K., the general formula (57)).

These are used for the purpose of reducing the viscosity of the photocurable resin composition to adjust the degree of gelation.

In addition, other examples of the compound (D) which is liquid at 25° C. include a liquid polymer such as an acrylic resin, liquid polybutadiene composed mainly of a 1,4-structural unit, hydrogenated polybutadiene, hydrogenated polyisoprene, hydrogenated polyisobutene, etc. These are used for other purpose of realizing low curing shrinkage and low dielectric constant.

The acrylic resin which is liquid at 25° C. is preferably an acrylic resin containing a constituent unit derived from an alkyl (meth)acrylate in which the alkyl group has a carbon number of from 4 to 18. In addition, an acrylic resin containing a constituent unit derived from an alkyl (meth)acrylate in which the alkyl group has a carbon number of from 4 to 18 and a constituent unit derived from styrene or benzyl (meth)acrylate is more preferable.

In addition, the hydrogenated polyisobutene which is liquid at 25° C. is commercially available as, for example, PARLEAM (a trade name manufactured by NOF Corporation).

In addition, the liquid polybutadiene composed mainly of a 1,4-structural unit is commercially available as, for example, POLYOIL (Zeon Corporation).

A number average molecular weight (Mn) of the liquid polymer is preferably from 500 to 5,000, more preferably from 800 to 4,000, and especially preferably from 1,000 to 3,000.

In the case of using the compound (D) which is liquid at 25° C., from the viewpoints of self-organization properties and transparency, its content is preferably from 1 to 99% by mass relative to the whole amount of the photocurable resin composition. From these viewpoints, the content of the compound (D) is more preferably from 2 to 98% by mass.

<Compound (E) which is Solid at 25° C.>

In addition, the photocurable resin composition according to the present invention may further contain a compound (E) which is solid at 25° C. (hereinafter also referred to as "component (E)"). The compound (E) which is solid at 25° C. may be added according to the purpose within the range where the self-organization properties are not impaired.

Examples of this compound (E) which is solid at 25° C. include a terpene-based hydrogenated resin and the like, and these are used for the purpose of enhancing the pressure-sensitive adhesiveness of the photocurable resin composition to adjust the degree of gelation. The terpene-based hydrogenated resin is commercially available as, for example, CLEARON P SERIES (a trade name manufactured by Yasuhara Chemical Co., Ltd.).

From the viewpoints of self-organization properties, transparency, and leakage resistance, the content of the compound (E) which is solid at 25° C. is preferably from 0.1 to 20% by mass relative to the whole amount of the photocurable resin composition. From these viewpoints, the content of the compound (E) is more preferably from 1 to 10% by mass.

[Other Additives]

The photocurable resin composition according to the present invention may contain various additives separately from the above-described components (A) to (E), as the need arises. In the present invention, examples of the various additives which can be contained include a polymerization inhibitor, an antioxidant, a light stabilizer, a silane coupling agent, a surfactant, a leveling agent, and the like.

The polymerization inhibitor is added for the purpose of increasing the storage stability of the photocurable resin composition, and examples thereof include p-methoxyphenol and the like.

The antioxidant is added for the purpose of increasing the heat-resistant colorability of a cured material obtained by curing the photocurable resin composition with light, and examples thereof include a phosphorus-based antioxidant such as triphenyl phosphite, etc.; a phenol-based antioxidant; a thiol-based antioxidant; and the like.

The light stabilizer is added for the purpose of increasing the resistance to light such as ultraviolet rays, etc., and examples thereof include HALS (hindered amine light stabilizer).

The silane coupling agent is added for the purpose of increasing the adhesion to a glass or the like, and examples thereof include methyltrimethoxysilane, methyltriethoxysilane, phenyltrimethoxysilane, phenyltriethoxysilane, γ-aminopropyltrimethoxysilane, γ-aminopropyltriethoxysilane, γ-glycidoxypropyltrimethoxysilane, γ-glycidoxypropylmethyldiethoxysilane, γ-glycidoxypropylmethyldiisopropenoxysilane, and the like.

The surfactant is added for the purpose of controlling the peelability, and examples thereof include a polydimethylsiloxane-based compound, a fluorine-based compound, and the like.

The leveling agent is added for the purpose of imparting flatness to the photocurable resin, and examples thereof include a silicon-based compound and a fluorine-based compound capable of decreasing the surface tension, and the like.

These additives may be used alone, or a combination of a plurality of additives may be used. Incidentally, in the case of using such an additive, its content is usually small as compared with the total content of the components (A) to (E) and is generally from about 0.01 to 5% by mass relative to the whole amount of the photocurable resin composition.

<Manufacturing Method of Photocurable Resin Composition>

The manufacturing method of the photocurable resin composition is not particularly limited, the photocurable resin composition can be manufactured by mixing the components (A) and (B) and if desired, the components (C) to (E) and the above-described additives and stirring the mixture.

In addition, in the case where any one of the respective components is solid, it is preferable to heat the solid component for dissolution at a timing of at least one of before mixing and stirring, during mixing and stirring, and after mixing and stirring. According to this, the respective components are well dispersed and then cooled, thereby obtaining the photocurable resin composition.

Though the heating temperature is not particularly limited, in the case of using 12-hydroxystearic acid as the oil gelling agent (B), the heating temperature is preferably from 60 to 150° C. When the heating temperature is 60° C. or higher, the 12-hydroxystearic acid can be sufficiently dissolved. When the heating temperature is not higher than 150° C., the high transparency can be kept.

Though the stirring time is not particularly limited, it is preferably from 10 to 600 seconds, and more preferably from 20 to 300 seconds.

<Image Display Device>

Next, an image display device using the photocurable resin composition according to the present invention is described.

The photocurable resin composition according to the present invention can be applied to various image display devices. Examples of the image display device include a plasma display panel (PDP), a liquid crystal display (LCD), a cathode ray tube (CRT), a field emission display (FED), an organic EL display (OELD), a 3D display, an electronic paper (EP), and the like.

The photocurable resin composition according to the present invention can be suitably used for laminating various layers configuring the image display device. Examples of the various layers include a functional layer having functionality, such as an antireflection layer, an antifouling layer, a dye layer, a hard coat layer, etc.; a multilayered material obtained by film-forming or laminating such a functional layer on a base material film such as a polyethylene film, a polyester film, etc.; a transparent protective plate such as a glass, an acrylic resin, an alicyclic polyolefin, a polycarbonate, etc.; a multilayered material obtained by film-forming or laminating a functional layer having a function of every kind on such a transparent protective plate; and the like. In addition, the photocurable resin composition according to the present invention can be used as an optical filter by photocuring to form a cured material and then combining with such a multilayered material. In that case, it is, for example, suitable that the photocurable resin composition according to the present invention is coated on or filled in the multilayered material, followed by curing.

The antireflection layer may be any layer so far as it has antireflection properties such that its reflectance against visible light is not more than 5%, and a layer obtained by treating a transparent base material such as a transparent plastic film, etc. by an already-known antireflection method can be used.

In addition, the antifouling layer is a layer for making stains hardly attach onto the surface. For the purpose of reducing the surface tension, an already-known layer constituted of a fluorine-based resin or a silicone-based resin can be used.

The dye layer is used for the purpose of increasing the color purity. In the case where the color purity of light emitting from an image display unit such as a liquid crystal display unit, etc., the dye layer is used for reducing unnecessary light. The dye layer can be obtained by dissolving, in a resin, a dye capable of absorbing light in an unnecessary portion, followed by film-forming or laminating on a base material film such as a polyethylene film, a polyester film, etc.

The hard coat layer is used for increasing the surface hardness. As the hard coat layer, those obtained by film-forming or laminating an acrylic resin made of urethane acrylate, epoxy acrylate, etc., an epoxy resin, or the like on a base material film such as a polyethylene film, etc. can be used. Similarly, for the purpose of increasing the surface hardness, those obtained by film-forming or laminating a hard coat layer on a transparent protective plate such as a glass, an acrylic resin, an alicyclic polyolefin, a polycarbonate, etc. can also be used.

The photocurable resin composition according to the present invention can be used upon being laminated on a polarizing plate. In that case, the photocurable resin composition can be laminated on the viewing surface side of the polarizing plate and can also be laminated on the opposite side thereto.

In the case of using the photocurable resin composition on the viewing surface side of the polarizing plate, an antireflection layer, an antifouling layer, an hard coat layer, and the like can be further laminated on the viewing surface side of the photocurable resin composition, and in the case of using the photocurable resin composition between the polarizing plate and the liquid crystal cell, a layer having functionality can be laminated on the viewing surface side of the polarizing plate.

In the case of forming such a laminate, the photocurable resin composition can be laminated using a roll laminator, a laminator, a vacuum laminator, a sheet laminator, or the like.

The photocurable resin composition is preferably disposed between the image display unit of the image display device and the transparent protective plate (protective panel) of the forefront surface on the viewing side and at an appropriate position on the viewing side. Specifically, the photocurable resin composition is preferably applied between the image display unit and the transparent protective plate.

In addition, in an image display device in which a touch panel is combined with an image display unit, the photocurable resin composition is preferably applied between the touch panel and the image display unit and/or between the touch panel and the transparent protective plate (protective panel). However, in view of the configuration of the image display device, so far as the photocurable resin composition according to the present invention is applicable, it should not be construed that the present invention is limited to the above-described positions.

Liquid crystal display devices that are an example of the image display device are hereunder described in detail by reference to FIGS. 2 and 3.

Figure 2:
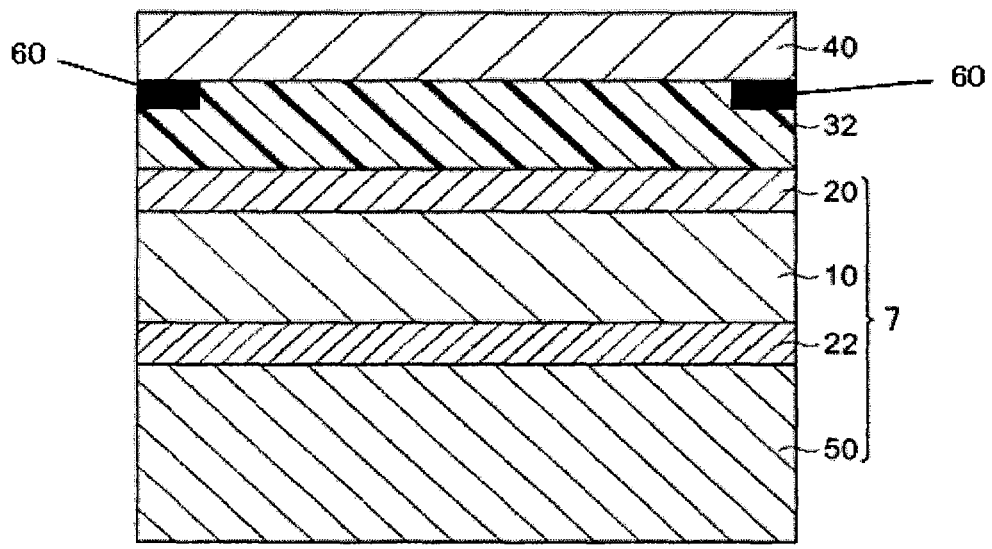
FIG. 2 is a side cross-sectional view schematically showing an embodiment of a liquid crystal display device.

<Image Display Device of FIG. 2>

FIG. 2 is a cross-sectional view schematically showing an embodiment of the liquid crystal display device according to the present invention. The liquid crystal display device shown in FIG. 2 is configured of an image display unit 7 in which a backlight system 50, a polarizing plate 22, a liquid display cell 10, and a polarizing plate 20 are laminated in this order; a transparent resin layer 32 provided on the upper surface of the polarizing plate 20 working as the viewing side of the liquid crystal display device; and a transparent protective plate (protective panel) 40 provided on the surface thereof. A level difference part 60 provided on the surface of the transparent protective plate 40 is filled with the transparent resin layer 32. Incidentally, the transparent resin layer 32 is basically corresponding to the photocurable resin composition according to the present embodiment. The thickness of the level difference part 60 varies depending upon the size of the liquid crystal display device or the like. In the case where the thickness of the level difference part 60 is from 30 μm to 100 μm, it is especially useful to use the photocurable resin composition according to the present embodiment.

Figure 3:
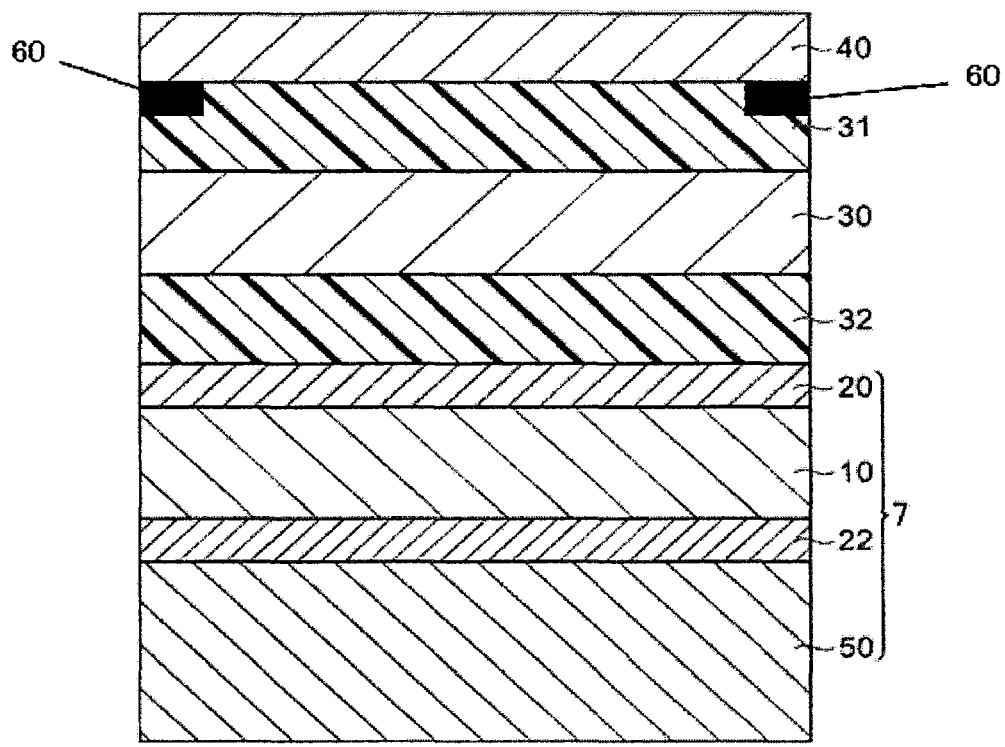
FIG. 3 is a side cross-sectional view schematically showing an embodiment of a liquid crystal display device having a touch panel mounted therein.
Figure 4:
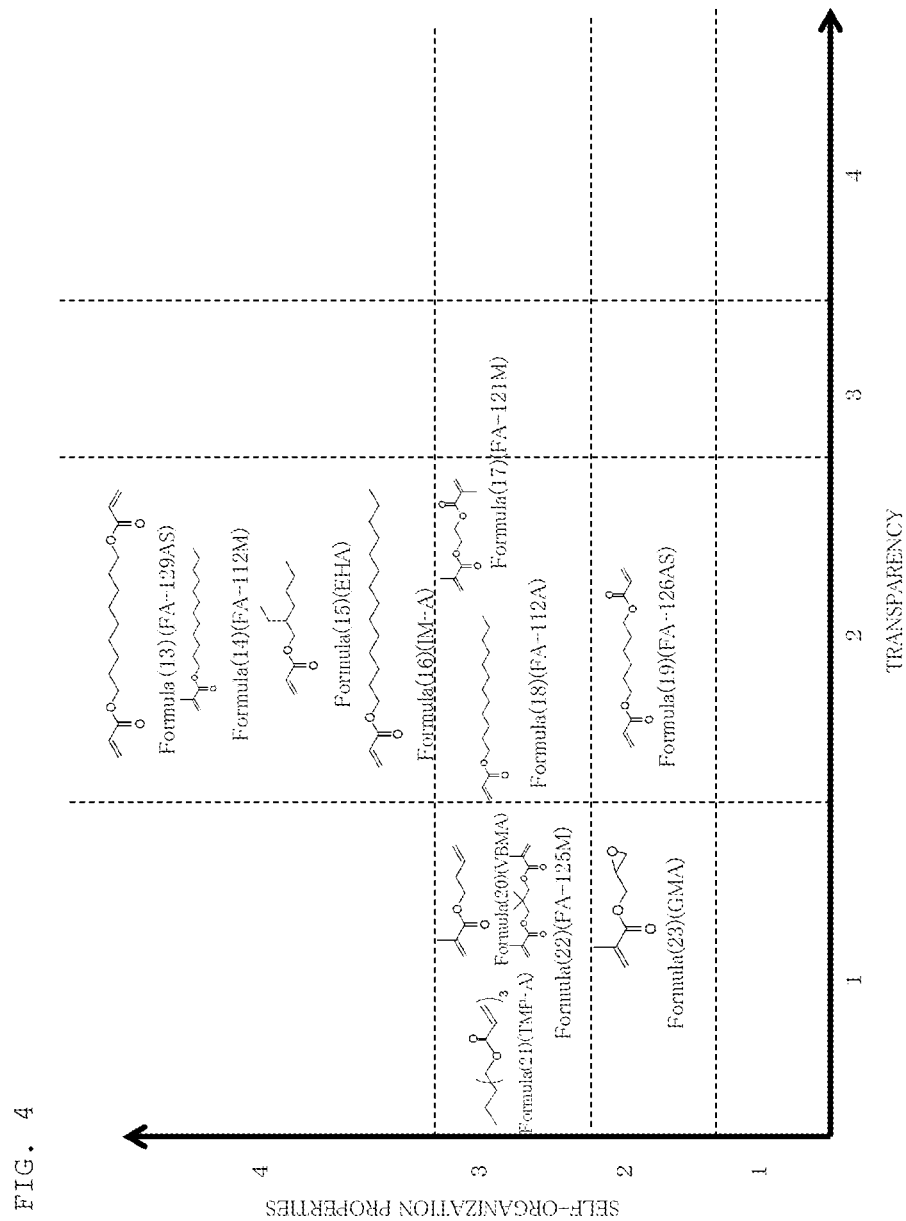
FIG. 4 is a graph showing evaluation results of Examples using an aliphatic (meth)acrylate as the component (A).

<Liquid Crystal Display Device of FIG. 3>

FIG. 3 is a cross-sectional view schematically showing a liquid crystal display device having a touch panel mounted thereon, which is an embodiment of the liquid crystal display device according to the present invention. The liquid crystal display device shown in FIG. 3 is configured of an image display unit 7 in which a backlight system 50, a polarizing plate 22, a liquid display cell 10, and a polarizing plate 20 are laminated in this order; a transparent resin layer 32 provided on the upper surface of the polarizing plate 20 working as the viewing side of the liquid crystal display device; a touch panel 30 provided on the upper surface of the transparent resin layer 32; a transparent resin layer 31 provided on the upper surface of the touch panel 30; and a transparent protective plate 40 provided on the surface thereof. A level difference part 60 provided on the surface of the transparent protective plate 40 is filled with the transparent resin layer 31. Incidentally, the transparent resin layer 31 and the transparent resin layer 32 are basically corresponding to the photocurable resin composition according to the present embodiment.

The level difference part 60 is provided for the purpose of, for example, at the time of providing input/output wirings in the surroundings of the information input device and the image display unit, allowing the wirings to be not seen or hardly seen from the side of the transparent protective plate. From the viewpoint of allowing the wirings to be not seen or hardly seen, the level difference part 60 is preferably made of a light-shielding material. However, the level difference part 60 may be provided for other purpose such as decoration, etc. and may be transparent. Though this level difference part 60 is provided on the lower surface of the transparent protective plate 40 (surface on the side coming into contact with the transparent resin layer 31), it may also be provided on the upper surface (surface on the far side against the transparent resin layer 31). Though this level difference part 60 is made of a material different from that of the transparent protective plate 40, it may be made of the same material, and these may be integrally formed. Though this level difference part 60 has a framework shape along the peripheral edge of the lower surface of the transparent protective plate 40, it should not be construed that the present invention is limited thereto. The planar view shape can be formed in an arbitrary shape such as a framework shape in which a part or the whole of the level difference part 60 does not follow the peripheral edge of the lower surface of the transparent protective plate 40, a U-shape, an L-shape, a linear shape, a wave shape, a dotted line shape, a lattice shape, a curved shape, etc. The same is also applicable to the level difference part 60 of the liquid crystal display device of FIG. 2.

Incidentally, in the liquid crystal display device of FIG. 3, though the transparent resin layer intervenes in each of between the image display unit 7 and the touch panel 30 and between the touch panel 30 and the transparent protective plate 40, the transparent resin layer may intervene in at least one of them. In addition, in the case where the touch panel is of an on-cell type, the touch panel and the liquid crystal display cell are integrated. Specific examples thereof include one in which the liquid crystal display cell 10 of the liquid crystal display device of FIG. 2 is replaced by one of an on-cell type.

In addition, in recent years, the development of a liquid crystal display cell having a touch panel function installed therein, which is called an in-cell type touch panel, is advanced. A liquid crystal display device equipped with such a liquid crystal display cell is configured of a transparent protective plate, a polarizing plate, and a liquid crystal display cell (touch panel function-provided liquid crystal display cell), and the photocurable resin composition according to the present invention can also be suitably used for a liquid crystal display device adopting such an in-cell type touch panel.

<Liquid Crystal Display Devices of FIGS. 2 and 3>

According to the liquid crystal display devices shown in FIGS. 2 and 3, since the photocurable resin composition according to the present embodiment is provided as the transparent resin layer 31 or 32, these liquid crystal display devices have impact resistance, and an image which is free from ghost reflections, is clear, and is high in contrast is obtained.

For the liquid crystal display cell 10, those constituted of a liquid crystal material which is well-known in the art can be used. In addition, though the liquid crystal display cell is classified into a TN (twisted nematic) mode, an STN (super-twisted nematic) mode, a VA (vertical alignment) mode, an IPS (in-place-switching) mode, or the like depending upon the control method of the liquid crystal material, in the present invention, the liquid crystal display cell may be a liquid crystal display cell adopting any control method.

As for the polarizing plates 20 and 22, a polarizing plate which is general in the art can be used. The surface of such a polarizing plate may be subjected to a treatment such as anti-reflection, antifouling, hard coating, etc. Such a surface treatment may be applied to one surface or both surfaces of the polarizing plate.

As for the touch panel 30, a touch panel which is generally used in the art can be used. The touch panel 30 includes, for example a resistive membrane system which finger pressure or pressure of object etc. make an electrode contact, an electrostatic capacitance type which detect the change of the electrostatic capacitance when a finger or an object touches the surface, and an inductive coupling type. The transparent resin layer of the present invention is especially preferable for a liquid crystal display device which has an electrostatic capacitance type touch panel. A touch panel having a structure of a transparent electrode built on a base substrate is exemplified for the electrostatic capacitance type touch panel. The base substrate includes a glass substrate, polyethylene terephthalate film, cycloolefin polymer film, etc., for example. The transparent electrode includes metal oxides such as ITO (Indium Tin Oxide), for example. The thickness of the base substrate falls within the range of 20-1000 μm. The thickness of the transparent electrode falls within the range of 10-500 nm.

Though the transparent resin layer 31 or 32 can be, for example, formed in a thickness of from 0.02 mm to 3 mm, from the viewpoints of step height covering properties and workability, it is preferably from 0.1 to 1 mm, and more preferably 0.15 mm (150 μm) to 0.5 mm (500 μm). In particular, in the photocurable resin composition according to the present embodiment, by making the film thick, a much more excellent effect can be exhibited, and such can be suitably adopted in the case of forming the transparent resin layer 31 or 32 of 0.1 mm or more.

In addition, the light transmittance of the transparent resin layer 31 or 32 against light beams in a visible light region (wavelength: 380 to 780 nm) is preferably 80% or more, more preferably 90% or more, and still more preferably 95% or more.

As for the transparent protective plate 40, a general optical transparent substrate can be used. Specific examples thereof include a plate of an inorganic material such as a glass, quartz, etc., a resin plate such as an acrylic resin, an alicyclic polyolefin, a polycarbonate, etc., and a resin sheet such as a thick polyester sheet, etc. In the case where a high surface hardness is required, a plate such as a glass, an acrylic resin, an alicyclic polyolefin, etc. is preferable, and a glass plate is more preferable. In the case where thinness or lightness is required, an acrylic resin, an alicyclic polyolefin, or a polycarbonate is preferable. The surface of such a transparent protective plate may be subjected to a treatment such as anti-reflection, antifouling, hard coating, etc. Such a surface treatment may be applied to one surface or both surfaces of the transparent protective plate. The transparent protective plate can also be used in combination of plural sheets thereof.

The backlight system 50 is representatively configured of reflection means such as an reflection plate, etc. and illumination means such as a lamp, etc.

As for a material of the level difference part 60, for example, an acrylic resin composition containing a black pigment, a low-melting point glass containing a metal oxide, and the like are used.

<Manufacturing Method of Image Display Device>
(Manufacturing Method of Liquid Crystal Display Device of FIG. 2)

The liquid crystal display device of FIG. 2 can be manufactured by a manufacturing method including a step of allowing the photocurable resin composition according to the present embodiment to intervene between the image display unit 7 and the transparent protective plate (protective panel) 40 having the level difference part 60.

That is, the photocurable resin composition according to the present invention is formed on the surface side of the transparent protective plate (protective panel) 40 on which the level difference part 60 is formed. The formation may be carried out by coating the photocurable resin composition according to the present invention on the transparent protective plate (protective panel) 40. In addition, the formation may also be carried out by previously forming the photocurable resin composition in a gel form on a release sheet, bringing the photocurable resin composition in a gel form into contact with the transparent protective plate (protective panel) 40, and pressing the assembly, followed by releasing the release sheet.

Thereafter, the resultant is superimposed on the upper surface of the polarizing plate 20, and these are laminated using the above-described laminator or the like.

After laminating using the laminator or the like, in the case where an air bubble is observed in the photocurable resin composition, it is preferable to carry out antifoaming using an autoclave or the like while adjusting a degree of pressurization at a prescribed temperature. In addition, defoaming can be carried out under reduced pressure, too.

Thereafter, the photocurable resin composition is cured upon irradiation with light to form the transparent resin layer 32, whereby the image display device of FIG. 2 can be suitably manufactured. As for this irradiation with light, it is preferable to perform irradiation of ultraviolet rays from the side of the transparent protective plate 40, the side of the image display unit 7, and the side of the image display device. According to this, reliability under high-temperature high-humidity conditions (reduction of air bubble generation and suppression of peeling) and adhesive strength can be enhanced. From the viewpoint of more enhancing reliability under high-temperature high-humidity conditions, it is preferable to perform irradiation of ultraviolet rays from the side of the image display unit 7 not having a level difference part. Though the dose of the ultraviolet rays is not particularly limited, it is preferably from about 500 to 5,000 mJ/cm$^2$.

(Manufacturing Method of Liquid Crystal Display Device of FIG. 3)

The liquid crystal display device of FIG. 3 can be manufactured by a manufacturing method including a step of allowing the photocurable resin composition according to the present embodiment to intervene between the image display unit 7 and the touch panel 30 and/or between the touch panel 30 and the transparent protective plate (protective panel) 40.

The transparent resin layer 31 can be manufactured by the same method as that of the transparent resin layer of FIG. 2. The transparent resin layer 32 can be manufactured by the same method as that of the transparent resin layer 32 of FIG. 2, except for coating the photocurable resin composition on the touch panel 30 in place of the transparent protective plate (protective panel) 40.

In the case of curing the photocurable resin composition according to the present invention, from the standpoint of more highly suppressing a warpage of the substrate of the transparent protective plate, the image display unit, or the like, the curing shrinkage ratio is preferably less than 10%, more preferably less than 5%, still more preferably less than 2%, and especially preferably less than 1%. When the curing shrinkage ratio is less than 10%, the warpage which may be generated in the image display unit can be sufficiently suppressed, and in the case where the photocurable resin composition is used for the image display device, the generation of inconvenience such as color unevenness, etc. can be prevented from occurring.

In the case of using the photocurable resin composition according to the present invention between the touch panel and the transparent protective layer, a dielectric constant at 100 Hz of a cured material of the photocurable resin composition is preferably not more than 7, more preferably not more than 5, still more preferably not more than 4, and especially preferably not more than 3. From the viewpoint of practical use, a lower limit value of the dielectric constant is preferably 2 or more.

EXAMPLES

The present invention is hereunder described with reference to the following Examples. Incidentally, it should not be construed that the present invention is limited to these Examples.

[Evaluation]

Photocurable resin compositions obtained in the respective Examples and Comparative Examples were evaluated in the following test methods.

(1) Step Height Covering Properties:

A photocurable resin composition sealed in a 5-mL syringe was coated on a glass substrate of 58 mm×86 mm×0.7 mm (thickness).

Subsequently, on one side of the photocurable resin composition on which the glass substrate was not laminated, a glass substrate (level difference: 60 µm) having a level difference part, the outer peripheral portion of which had been printed so as to have a thickness of 60 µm, was laminated so as to interpose the photocurable resin composition therebetween by using a laminator. Incidentally, the glass substrate having a level difference part, the outer peripheral portion of which had been printed, has the same outer dimension as that of the glass substrate, and it has an opening having an inner dimension of 45 mm×68 mm. The above-described glass substrate was used in placed of an information input device or an image display unit and evaluated for the step height covering properties.

(Evaluation Criteria)

A: The photocurable resin composition can be filled leaving no air gap in the level difference part without causing leakage.

B: The photocurable resin composition flows out into the surroundings from the top of the glass substrate.

(2) Evaluation of Self-Organization Properties:

A photocurable resin composition was added in a 2-mL screw tube and allowed to stand in an oven at 100° C. (forced convection constant temperature oven: DN-400, manufactured by Yamato Scientific Co., Ltd.) until the oil gelling agent was dissolved. Subsequently, the solution was rapidly made uniform using a planetary centrifugal mixer, ARE-250 (manufactured by Thinky Corporation) under conditions at 2,000 rpm for 20 seconds and then allowed to stand at 25° C. for 30 minutes. Thereafter, the screw tube was inclined at about 60° and allowed to stand for 3 minutes, and the self-organization properties were then evaluated.

(Evaluation Criteria)

4: The photocurable resin composition does not flow and keeps the shape.

3: Though the photocurable resin composition keeps the gel state as a whole, it has fluidity slightly.

2: The photocurable resin composition is separated into the gel state and the liquid state.

1: The photocurable resin composition is entirely liquid and has fluidity.

(3) Evaluation of Transparency:

2 g of a photocurable resin composition was added in a 2-mL screw tube and allowed to stand in an oven at 100° C.

(forced convection constant temperature oven: DN-400, manufactured by Yamato Scientific Co., Ltd.) until the oil gelling agent was dissolved. Subsequently, the solution was rapidly made uniform using a planetary centrifugal mixer, ARE-250 (manufactured by Thinky Corporation) under conditions at 2,000 rpm for 20 seconds and then allowed to stand at 25° C. for 30 minutes. The transparency of the contents of the screw tube was evaluated.
(Evaluation Criteria)
4: Even when the contents are made to look under a fluorescent lamp, any turbidity is not observed.
3: When the contents are made to look under a fluorescent lamp, it is noted that the contents are turbid.
2: The contents are slightly turbid.
1: The contents are turbid to such a degree that when seen from the observer side, the opposite side is not distinctly seen.
(4) Dielectric Constant:

A release PET film (IUPILON A63 manufactured by Teijin DuPont) was placed on the surface of a glass substrate, a circular frame (thickness: 2 mm, inner diameter: 56 mm) made of a silicon rubber was placed thereon, and a photocurable resin composition was flown into the inside of the frame. A release PET film was further placed thereon, and UV irradiation was performed on the surface one by one (performed dose on one surface: 1 J/cm$^2$) to obtain a molded body. In the molded body, the release PET film was released to obtain a cured film of the photocurable resin composition. The thickness (d) of this cured film was measured using a micrometer (a product number: 543-285B ID-C112RB, manufactured by Mitutoyo Corporation). Thereafter, an aluminum plate (thickness: 2 mm) having a diameter of 56 mm was laminated on one surface of the cured film, and a copper foil (thickness: 80 µm) having a diameter of 36 mm and a ring-shaped copper foil (thickness: 80 µm) having an outer diameter of 54 mm and an inner diameter of 40 mm were laminated in this order on the other surface, thereby preparing a measurement sample. This measurement sample was held with a measurement jig "HP16451B", manufactured by Hewlett-Packard Company, and its electrostatic capacity (C) was measured under conditions at 25° C. and at a frequency of 100 kHz using an analyzer "HP4275A", manufactured by Hewlett-Packard Company and then substituted for the following equation to determine a dielectric constant $\in_r$. Here, $\in_0$ is a vacuum dielectric constant.

$C=\in_0\times\in_r\times(\pi\times18\ mm\times18\ mm)/d$ (5) Curing Shrinkage Ratio:

A photocurable resin composition was dropped onto a release PET film ("IUPILON A63", manufactured by Teijin DuPont), and another sheet of a release PET film ("IUPILON A63", manufactured by Teijin DuPont) was laminated so as to have a film thickness of 175 µm. Ultraviolet ray irradiation was performed at a dose of 1,000 mJ/cm$^2$ from the side of one of the release PET films by using an ultraviolet ray irradiation apparatus, thereby fabricating a transparent sheet having the photocurable resin composition cured therein. This transparent sheet and the photocurable resin composition before curing were measured for a specific density using an electronic densimeter ("SD-200L", manufactured by Alfa Mirage Co., Ltd.), and the curing shrinkage ratio was calculated according to the following equation.

Curing shrinkage ratio (%)=[{(Specific gravity of resin composition after curing)−(Specific gravity of resin composition before curing)}/(Specific gravity of resin composition after curing)]×100

Manufacturing Example 1

A compound (A1) having a photopolymerizable functional group was manufactured according to the following operations.

9.9 g of lauryl acrylate (manufactured by Kyoeisha Chemical Co., Ltd.), 0.1 g of 4-hydroxybutyl acrylate (NBA, manufactured by Nippon Kasei Chemical Co., Ltd.), 0.15 g of n-octyl mercaptan (manufactured by Wako Pure Chemical Industries, Ltd.), and 0.05 g of PERBUTYL O (manufactured by NOF Corporation) were charged in a screw tube, and after stirring, the screw tube was put in a water bath at 80° C. and heated for 4 hours. Subsequently, the resulting screw tube was heated in a forced convection constant temperature oven (DN-400, manufactured by Yamato Scientific Co., Ltd.) at 100° C. for one hour and then taken out from the forced convection constant temperature oven, followed by allowing it to stand until the temperature reached room temperature. Subsequently, 0.0051 g of methyl ether hydroquinone (manufactured by Wako Pure Chemical Industries, Ltd.) and 0.108 g of 2-isocyanatoethyl isocyanate ("KARENZ MOI", manufactured by Showa Denko K.K.) were charged. The resulting screw tube was heated in a bath at 60° C. for 3 hours, thereby obtaining an acrylic resin (A1) having a methacryloyl group in a side chain thereof.

Manufacturing Example 2

An acrylic resin (A2) having a methacryloyl group in a side chain thereof was obtained by carrying out the same operations as those in Manufacturing Example 1, except for using 2-ethylhexyl acrylate (manufactured by Hitachi Chemical Co., Ltd.) in place of the lauryl acrylate.

Manufacturing Example 3

A compound (D) which is liquid at 25° C. was manufactured according to the following operations.

4 g of styrene (manufactured by Wako Pure Chemical Industries, Ltd.), 6 g of lauryl acrylate ("FA-112A", manufactured by Hitachi Chemical Co., Ltd.), 0.15 g of n-octyl mercaptan (manufactured by Wako Pure Chemical Industries, Ltd.), and 0.05 g of PERBUTYL O (manufactured by NOF Corporation) were charged in a screw tube, and after stirring, the screw tube was put in a water bath at 80° C. and heated for 4 hours. Subsequently, the resulting screw tube was heated in an oven at 100° C. for one hour, thereby obtaining a compound (D) which is liquid at 25° C. (number average molecular weight: 2,000).

Manufacturing Example 4

4 g of benzyl acrylate ("FA-BZA", manufactured by Hitachi Chemical Co., Ltd.), 6 g of lauryl acrylate ("FA-112A", manufactured by Hitachi Chemical Co., Ltd.), 0.15 g of n-octyl mercaptan (manufactured by Wako Pure Chemical Industries, Ltd.), and 0.05 g of PERBUTYL O (manufactured by NOF Corporation) were charged in a screw tube, and after stirring, the screw tube was put in a water bath at 80° C. and heated for 4 hours. Subsequently, the resulting screw tube was heated in an oven at 100° C. for one hour, thereby obtaining a compound (D) which is liquid at 25° C. (number average molecular weight: 2,000).

Manufacturing Example 5

4 g of benzyl acrylate ("FA-BZA", manufactured by Hitachi Chemical Co., Ltd.), 6 g of 2-ethylhexyl acrylate (manufactured by Wako Pure Chemical Industries, Ltd.), 0.15 g of n-octyl mercaptan (manufactured by Wako Pure Chemical industries, Ltd.), and 0.05 g of PERBUTYL O (manufactured by NOF Corporation) were charged in a screw tube, and after stirring, the screw tube was put in a water bath at 80° C. and heated for 4 hours. Subsequently, the resulting screw tube was heated in an oven at 100° C. for one hour, thereby obtaining a compound (D) which is liquid at 25° C. (number average molecular weight: 2,000).

Manufacturing Example 6

4 g of benzyl acrylate ("FA-BZA", manufactured by Hitachi Chemical Co., Ltd.), 6 g of isomyristyl acrylate ("LIGHT ACRYLATE IM-A", manufactured by Kyoeisha Chemical Co., Ltd.), 0.15 g of n-octyl mercaptan (manufactured by Wako Pure Chemical Industries, Ltd.), and 0.05 g of PERBUTYL O (manufactured by NOF Corporation) were charged in a screw tube, and after stirring, the screw tube was put in a water bath at 80° C. and heated for 4 hours. Subsequently, the resulting screw tube was heated in an oven at 100° C. for one hour, thereby obtaining a compound (D) which is liquid at 25° C. (number average molecular weight: 2,000).

Manufacturing Example 7

4 g of dicyclopentanyl acrylate ("FA-513AS", manufactured by Hitachi Chemical Co., Ltd.), 6 g of 2-ethylhexyl acrylate (manufactured by Wako Pure Chemical Industries, Ltd.), 0.15 g of n-octyl mercaptan (manufactured by Wako Pure Chemical Industries, Ltd.), and 0.05 g of PERBUTYL O (manufactured by NOF Corporation) were charged in a screw tube, and after stirring, the screw tube was put in a water bath at 80° C. and heated for hours. Subsequently, the resulting screw tube was heated in an oven at 100° C. for one hour, thereby obtaining a compound (D) which is liquid at 25° C. (number average molecular weight: 2,000).

Manufacturing Example 8

4 g of nonylphenoxy polyethylene glycol acrylate ("FA-314A", manufactured by Hitachi Chemical Co., Ltd.), 6 g of 2-ethylhexyl acrylate (manufactured by Wako Pure Chemical Industries, Ltd.), 0.15 g of n-octyl mercaptan (manufactured by Wako Pure Chemical Industries, Ltd.), and 0.05 g of PERBUTYL O (manufactured by NOF Corporation) were charged in a screw tube, and after stirring, the screw tube was put in a water bath at 80° C. and heated for hours. Subsequently, the resulting screw tube was heated in an oven at 100° C. for one hour, thereby obtaining a compound (D) which is liquid at 25° C. (number average molecular weight: 2,000).

Manufacturing Example 9

4 g of SILAPLANE TM-0701 (a trade name manufactured by JNC Corporation), 6 g of lauryl acrylate ("FA-112A", manufactured by Hitachi Chemical Co., Ltd.), 0.15 g of n-octyl mercaptan (manufactured by Wako Pure Chemical Industries, Ltd.), and 0.05 g of PERBUTYL O (manufactured by NOF Corporation) were charged in a screw tube, and after stirring, the screw tube was put in a water bath at 80° C. and heated for 4 hours. Subsequently, the resulting screw tube was heated in an oven at 100° C. for one hour, thereby obtaining a compound (D) which is liquid at 25° C. (number average molecular weight: 2,000).

Manufacturing Example 10

In a reactor equipped with a condenser, a thermometer, a stirrer, a dropping funnel, and an air injection pipe, 978.2 parts by mass of α,ω-polybutadiene glycol [a trade name: POLYBUTADIENE GLYCOL G-3000, manufacture by Nippon Soda Co., Ltd., content proportion of {(1,2-structural unit)/(1,4-structural unit)}=90/10, hydroxyl value=27 mg-KOH/g], 0.5 parts by mass of p-methoxyphenol as a polymerization inhibitor, and 0.05 parts by mass of dibutyltin dilaurate (a trade name: "L101", manufactured by Tokyo Fine Chemical Co., Ltd.) as a catalyst were added. Then, the temperature was increased to 70° C. while allowing air to flow into the inside of the reactor, and thereafter, 20.3 parts by mass of 2-isocyanatoethyl methacrylate (a trade name: "KARENZ MOI", manufactured by Showa Denko K.K.) was uniformly dropped over one hour while stirring at from 70 to 75° C., thereby undergoing reaction.

After completion of dropping, the reaction was carried out for 5 hours. As a result of IR measurement (infrared absorption analysis), when vanishing of the isocyanate was confirmed, the reaction was finished to obtain polybutadiene methacrylate having a methacryloyl group in an end thereof (weight average molecular weight: 7,700). An average value of methacryloyl groups of this polybutadiene methacrylate per molecule (average functional group number) was 0.5 (calculated value from the charged amount).

Incidentally, the weight average molecular weight and the number average molecular weight are each a value determined by undergoing gel permeation chromatography with tetrahydrofuran (THF) as a solvent and conducting conversion using a calibration curve of standard polystyrene using the following apparatus and measurement conditions. In fabricating the calibration curve, a five-sample set (a trade name, "PStQuick MP-H, PStQuick B", manufactured by Tosoh Corporation) was used as the standard polystyrene.

Apparatus: High-performance GPC apparatus, HCL-8320GPC (detector: differential refractometer or UV) (a trade name, manufactured by Tosoh Corporation)

Solvent used: Tetrahydrofuran (THF)

Column: Column TSKGEL SuperMultipore HZ-H (a trade name, manufactured by Tosoh Corporation)

Column size: Column length=15 cm, column inner diameter=4.6 mm

Measurement temperature: 40° C.

Flow rate: 0.35 mL/min

Sample concentration: 10 mg/5 mL-THF

Injection amount: 20 μL

[Raw Materials]

In addition, the following raw materials were used in the Examples and Comparative Examples described below.

FA-129AS: Compound of the general formula (13), a trade name, manufactured by Hitachi Chemical Co., Ltd.

FA-112M: Compound of the general formula (14), a trade name, manufactured by Hitachi Chemical Co., Ltd.

EHA: Compound of the general formula (15), 2-ethylhexyl acrylate, manufactured by Wako Pure Chemical Industries, Ltd.

IM-A: Compound of the general formula (16), a trade name: "LIGHT ACRYLATE IM-A" (isomer mixture of C14), manufactured by Kyoeisha Chemical Co., Ltd.

FA-121M: Compound of the general formula (17), a trade name, manufactured by Hitachi Chemical Co., Ltd.

FA-112A: Compound of the general formula (18), a trade name, manufactured by Hitachi Chemical Co., Ltd.

FA-126AS: Compound of the general formula (19), a trade name, manufactured by Hitachi Chemical Co., Ltd.

VBMA: Compound of the general formula (20), a name of an article made on an experimental basis, manufactured by Hitachi Chemical Co., Ltd.

TMP-A: Compound of the general formula (21), a trade name: "LIGHT ACRYLATE TMP-A", manufactured by Kyoeisha Chemical Co., Ltd.

FA-125M: Compound of the general formula (22), a trade name, manufactured by Hitachi Chemical Co., Ltd.

GMAG: Compound of the general formula (23), a trade name: "GMA LIGHT ESTER G", manufactured by Kyoeisha Chemical Co., Ltd.

FA-314A: Compound of the general formula (24), a trade name, manufactured by Hitachi Chemical Co., Ltd.

FA-318A: Compound of the general formula (25), a trade name, manufactured by Hitachi Chemical Co., Ltd.

FA-BZM: Compound of the general formula (26), a trade name, manufactured by Hitachi Chemical Co., Ltd.

FA-BZA: Compound of the general formula (27), a trade name, manufactured by Hitachi Chemical Co., Ltd.

FA-321A: Compound of the general formula (28), a trade name, manufactured by Hitachi Chemical Co., Ltd.

FA-3218M: Compound of the general formula (29), a trade name, manufactured by Hitachi Chemical Co., Ltd.

FA-321M: Compound of the general formula (30), a trade name, manufactured by Hitachi Chemical Co., Ltd.

FA-323M: Compound of the general formula (31), a trade name, manufactured by Hitachi Chemical Co., Ltd.

PO-A: Compound of the general formula (32), a trade name: "LIGHT ACRYLATE PO-A", manufactured by Kyoeisha Chemical Co., Ltd.

FA-324M: Compound of the general formula (33), a trade name, manufactured by Hitachi Chemical Co., Ltd.

FA-324A: Compound of the general formula (34), a trade name, manufactured by Hitachi Chemical Co., Ltd.

FA-302A: Compound of the general formula (35), a trade name, manufactured by Hitachi Chemical Co., Ltd.

A-BPFE: Compound of the general formula (36), a trade name, manufactured by Shin-Nakamura Chemical Co., Ltd.

DCP-A: Compound of the general formula (37), a trade name: "LIGHT ACRYLATE DCP-A", manufactured by Kyoeisha Chemical Co., Ltd.

FA-512M: Compound of the general formula (38), a trade name, manufactured by Hitachi Chemical Co., Ltd.

FA-512AS: Compound of the general formula (39), a trade name, manufactured by Hitachi Chemical Co., Ltd.

FA-513M: Compound of the general formula (40), a trade name, manufactured by Hitachi Chemical Co., Ltd.

FA-513AS: Compound of the general formula (41), a trade name, manufactured by Hitachi Chemical Co., Ltd.

IB-XA: Compound of the general formula (42), a trade name: "LIGHT ACRYLATE IB-XA", manufactured by Kyoeisha Chemical Co., Ltd.

FA-511AS: Compound of the general formula (43), a trade name, manufactured by Hitachi Chemical Co., Ltd.

FA-731A: Compound of the general formula (44), a trade name, manufactured by Hitachi Chemical Co., Ltd.

FA-P240A: Compound of the general formula (45), a trade name, manufactured by Hitachi Chemical Co., Ltd.

FA-731AT: Compound of the general formula (46), a trade name, manufactured by Hitachi Chemical Co., Ltd.

LIGHT ACRYLATE 130A: Compound of the general formula (47), a trade name, manufactured by Kyoeisha Chemical Co., Ltd.

X-22-164AS: Compound of the general formula (48), a trade name, manufactured by Shin-Etsu Chemical Co., Ltd.

SILAPLANE TM-0701(TRIS): Compound of the general formula (49), a trade name, manufactured by JNC Corporation PB-MOI: Compound of the general formula (50), which is obtained by allowing G-3000 (a trade name for α,ω-polybutadiene glycol, manufactured by Nippon Soda Co., Ltd.) to react with KARENZ MOI (a trade name for 2-isocyanatoethyl methacrylate, manufactured by Showa Denko K.K.)

TEAI-1000: Compound of the general formula (51), a trade name of Nippon Soda Co., Ltd.

UC-102: Compound of the general formula (52), a trade name, manufactured by Kuraray Co., Ltd., n=2, number average molecular weight: 17,000

UC-203: Compound of the general formula (52), a trade name, manufactured by Kuraray Co., Ltd., n=3, number average molecular weight: 35,000

STC: Compound (styrene) of the general formula (53), manufactured by Wako Pure Chemical Industries, Ltd.

RICON-130: Compound of the general formula (54), a trade name, manufactured by Cray Valley RICON-131: Compound of the general formula (54), a trade name, manufactured by Cray Valley TAIC: Compound of the general formula (55), a trade name manufactured by Nippon Kasei Chemical Co., Ltd.

GBA: Glycidyl methacrylate manufactured by Kyoeisha Chemical Co., Ltd.

GEL ALL D: 1,3:2,4-Bis-O-benzylidene-D-glucitol manufactured by New Japan Chemical Co., Ltd.

HSA: 12-Hydroxystearic acid

I-184: IRGACURE 184, 1-hydroxycyclohexyl phenyl ketone

I-189: IRGACURE 189, bis(2,4,6-trimethylbenzoyl)phenylphosphine oxide

HPMA: 2-Hydroxypropyl methacrylate manufactured by Nippon Shokubai Co., Ltd.

HOB: 2-Hydroxybutyl methacrylate manufactured by Kyoeisha Chemical Co., Ltd.

POLYOIL: Liquid 1,4-polybutadiene manufactured by Zeon Corporation

PARLEAM 6: Hydrogenated polyisobutene manufactured by NOF Corporation

FA-711MM: Pentamethylpiperidyl methacrylate manufactured by Hitachi Chemical Co., Ltd.

TMBP (ESACURE TZT): 2,4,6-Trimethylbenzophenone manufactured by DKSH Japan K.K.

TPO: 2,4,6-Trimethylbenzoyl diphenyl phosphine oxide manufactured by BASE SE

LIQUID P: Liquid paraffin manufactured by Wako Pure Chemical industries, Ltd.

P85 (CLEARON P-85): Terpene-based hydrogenated resin manufactured by Yasuhara Chemical Co., Ltd.

PE-1 (KARENZ MT PE1): Compound of the general formula (57), pentaerythritol tetrakis(3-mercaptobutyrate) manufactured by Showa Denko K.K.

DUP: Compound of the general formula (56), diundecyl phthalate manufactured by J-PLUS Co., Ltd.

HBA: 4-Hydroxybutyl acrylate manufactured by Nippon Kasei Chemical Co., Ltd.

Examples 1 to 60

Example 1

98% by mass of o-phenylphenoxyethyl acrylate ("FA-302A", manufactured by Hitachi Chemical Co., Ltd.) as the compound (A) having a photopolymerizable functional group, 1% by mass of n-lauroyl-L-glutamic acid-α,β-dibutylamide (hereinafter referred to as "GBA") as the oil gelling agent (B), and 1% by mass of 1-hydroxycyclohexyl phenyl ketone (manufactured by BASF SE, hereinafter referred to as "I-184") as the photopolymerization initiator (C) were charged in a screw tube, and the crew tube was heated in a water bath at 90° C. to dissolve the oil gelling agent (B), thereby obtaining a photocurable resin composition (1). The obtained photocurable resin composition (1) was subjected to the above-described evaluations. Evaluation results are shown in Table 1.

Examples 2 to 60

Photocurable resin compositions were prepared in the same manner as that in Example 1, except for changing the composition and % by mass as shown in Tables 1 to 6, and then subjected to the above-described evaluations. Evaluation results are shown in Tables 1 to 6.

Incidentally, with respect to the Examples in which the evaluation result of the self-organization properties was "2", the portion in a liquid state was removed, and the step height covering properties were evaluated.

TABLE 1

| | | | Example | | | | | | | | | |
|---|---|---|---|---|---|---|---|---|---|---|---|---|
| | | | 1 | 2 | 3 | 4 | 5 | 6 | 7 | 8 | 9 | 10 | 11 |
| Raw material | | | | | | | | | | | | | |
| Component (A) | Type | FA-302A | HBA | BZA | BZA | FA-512M | DCP-A | FA-314A | FA-321A | FA-112A | TRIS | 130A |
| | % by mass | 98 | 98 | 98 | 98 | 98 | 98 | 98 | 98 | 98 | 98 | 98 |
| Component (B) | Type | GBA | GBA | GEL ALL D | HSA | HSA | HSA | HSA | HSA | HSA | HSA | HSA |
| | % by mass | 1 | 1 | 1 | 1 | 1 | 1 | 1 | 1 | 1 | 1 | 1 |
| Component (C) | Type | I-184 | I-184 | I-184 | I-184 | I-184 | I-184 | I-184 | I-184 | I-184 | I-184 | I-184 |
| | % by mass | 1 | 1 | 1 | 1 | 1 | 1 | 1 | 1 | 1 | 1 | 1 |
| Component (D) | Type | — | — | — | — | — | — | — | — | — | — | — |
| | % by mass | — | — | — | — | — | — | — | — | — | — | — |
| Component (E) | Type | — | — | — | — | — | — | — | — | — | — | — |
| | % by mass | — | — | — | — | — | — | — | — | — | — | — |
| Evaluation | | | | | | | | | | | | |
| Step height covering properties | — | A | A | A | A | A | A | A | A | A | A | A |
| Self-organization properties | — | 4 | 4 | 4 | 2 | 2 | 4 | 4 | 4 | 3 | 4 | 4 |
| Transparency | — | 4 | 4 | 4 | 4 | 4 | 4 | 4 | 3 | 2 | 1 | 1 |
| Curing shrinkage ratio | % | 10 | 14 | 15 | 15 | 5 | 6 | 5 | 8 | 6 | 12 | 6 |
| Dielectric constant | — | 3.5 | 7 | 3.7 | 3.7 | 2.4 | 2.3 | 3.6 | 4.2 | 2.3 | 3.4 | 5.4 |

TABLE 2

| | | | Example | | | | | | | |
|---|---|---|---|---|---|---|---|---|---|---|
| | | | 12 | 13 | 14 | 15 | 16 | 17 | 18 | 19 |
| Raw material | | | | | | | | | | |
| Component (A) | Type | FA-121M | FA-126AS | FA-129AS | FA-731A | FA-P240A | TMP-A | 164AS | TAIC |
| | % by mass | 98 | 98 | 98 | 98 | 98 | 98 | 98 | 98 |
| Component (B) | Type | HSA | HSA | HSA | HSA | HSA | HSA | HSA | HSA |
| | % by mass | 1 | 1 | 1 | 1 | 1 | 1 | 1 | 1 |
| Component (C) | Type | I-184 | I-184 | I-184 | I-184 | I-184 | I-184 | I-184 | I-184 |
| | % by mass | 1 | 1 | 1 | 1 | 1 | 1 | 1 | 1 |
| Component (D) | Type | — | — | — | — | — | — | — | — |
| | % by mass | — | — | — | — | — | — | — | — |
| Component (E) | Type | — | — | — | — | — | — | — | — |
| | % by mass | — | — | — | — | — | — | — | — |
| Evaluation | | | | | | | | | | |
| Step height covering properties | — | A | A | A | A | A | A | A | A |
| Self-organization properties | — | 3 | 2 | 4 | 3 | 2 | 3 | 4 | 4 |
| Transparency | — | 2 | 2 | 2 | 2 | 2 | 1 | 1 | 4 |
| Curing shrinkage ratio | % | 16 | 15 | 14 | 16 | 13 | 18 | 6 | 13 |
| Dielectric constant | — | 4.8 | 4.3 | 4 | 4.4 | 5.6 | 4.8 | 3.3 | 4.5 |

TABLE 3

| | | | Example | | | | | | | | | | | |
|---|---|---|---|---|---|---|---|---|---|---|---|---|---|---|
| | | | 20 | 21 | 22 | 23 | 24 | 25 | 26 | 27 | 28 | 29 | 30 | 31 |
| Raw material | | | | | | | | | | | | | | |
| Component (A) | Type | FA-129AS | FA-129AS | FA-129AS | FA-129AS | FA-129AS | FA-129AS | FA-129AS | FA-126AS | FA-129AS | DCP-A | TAIC | FA-129AS |
| | % by mass | 5 | 10 | 10 | 5 | 2 | 2 | 2 | 2 | 2 | 2 | 5 | 2 |

TABLE 3-continued

|  |  | Example | | | | | | | | | | | |
|---|---|---|---|---|---|---|---|---|---|---|---|---|
|  |  | 20 | 21 | 22 | 23 | 24 | 25 | 26 | 27 | 28 | 29 | 30 | 31 |
| Component (B) | Type | HSA | HSA | HSA | HSA | HSA | HSA | HSA | HSA | HSA | HSA | HSA | HSA |
|  | % by mass | 1 | 1 | 1 | 1 | 1 | 0.5 | 5 | 1 | 1 | 1 | 1 | 1 |
| Component (C) | Type | I-184 | I-184 | I-184 | I-184 | I-184 | I-184 | I-184 | I-184 | I-184 | I-184 | I-184 | I-184 |
|  | % by mass | 1 | 1 | 1 | 1 | 1 | 1 | 1 | 1 | 1 | 1 | 1 | 1 |
| Component (D) | Type | Manufacturing Example 3 | Manufacturing Example 4 | Manufacturing Example 4 | Manufacturing Example 4 | Manufacturing Example 4 | Manufacturing Example 4 | Manufacturing Example 4 | Manufacturing Example 5 | Manufacturing Example 6 | Manufacturing Example 7 | Manufacturing Example 8 | Manufacturing Example 9 |
|  | % by mass | 93 | 88 | 78 | 93 | 96 | 96.5 | 92 | 96 | 96 | 96 | 93 | 96 |
|  | Type | — | — | Toluene | — | — | — | — | — | — | — | — | — |
|  | % by mass | — | — | 10 | — | — | — | — | — | — | — | — | — |
| Component (E) | Type | — | — | — | — | — | — | — | — | — | — | — | — |
|  | % by mass | — | — | — | — | — | — | — | — | — | — | — | — |
| Evaluation |  |  |  |  |  |  |  |  |  |  |  |  |  |
| Step height covering properties | — | A | A | A | A | A | A | A | A | A | A | A | A |
| Self-organization properties | — | 4 | 4 | 4 | 4 | 4 | 4 | 4 | 4 | 4 | 4 | 4 | 4 |
| Transparency | — | 3 | 4 | 4 | 4 | 4 | 4 | 4 | 4 | 4 | 3 | 3 | 2 |
| Curing shrinkage ratio | % | 0.7 | 1 | 1 | 0.7 | 0.3 | 0.3 | 0.3 | 0.3 | 0.3 | 0.3 | 0.5 | 0.3 |
| Dielectric constant | — | 4 | 4.1 | 3.8 | 4 | 3.8 | 3.8 | 3.8 | 3.9 | 3.9 | 3.6 | 3.9 | 4.1 |

TABLE 4

|  |  | Example | | | |
|---|---|---|---|---|---|
|  |  | 32 | 33 | 34 | 35 |
| Raw material |  |  |  |  |  |
| Component (A) | Type | Manufacturing Example 1 | Manufacturing Example 1 | Manufacturing Example 2 | Manufacturing Example 2 |
|  | % by mass | 98 | 93 | 98 | 93 |
|  | Type | — | FA-129AS | — | FA-129AS |
|  | % by mass | — | 5 | — | 5 |
| Component (B) | Type | HSA | HSA | HSA | HSA |
|  | % by mass | 1 | 1 | 1 | 1 |
| Component (C) | Type | I-184 | I-184 | I-184 | I-184 |
|  | % by mass | 1 | 1 | 1 | 1 |
| Component (D) | Type | — | — | — | — |
|  | % by mass | — | — | — | — |
| Component (E) | Type | — | — | — | — |
|  | % by mass | — | — | — | — |
| Evaluation |  |  |  |  |  |
| Step height covering properties | — | A | A | A | A |
| Self-organization properties | — | 4 | 4 | 4 | 4 |
| Transparency | — | 3 | 3 | 3 | 3 |
| Curing shrinkage ratio | % | 0.6 | 1.2 | 0.7 | 1.3 |
| Dielectric constant | — | 4 | 4 | 3.9 | 4.1 |

TABLE 5

|  |  | Example | | | | | | | |
|---|---|---|---|---|---|---|---|---|---|
|  |  | 36 | 37 | 38 | 39 | 40 | 41 | 42 | 43 |
| Raw material |  |  |  |  |  |  |  |  |  |
| Component (A) | Type | UC-102 | UC-102 | UC-102 | UC-102 | UC-102 | UC-102 | UC-102 | UC-102 |
|  | % by mass | 98 | 78 | 49 | 49 | 40 | 39 | 30 | 30 |
|  | Type | — | — | FA-512A | FA-129AS | RICON 130 | RICON 130 | RICON 130 | RICON 130 |
|  | % by mass | — | — | 49 | 49 | 58 | 49 | 58 | 58 |

TABLE 5-continued

| | | | | | | | | | | |
|---|---|---|---|---|---|---|---|---|---|---|
| | Type | — | — | — | — | — | — | FA-513M | FA-512AS |
| | % by mass | — | — | — | — | — | — | 10 | 10 |
| | Type | — | — | — | — | — | — | — | — |
| | % by mass | — | — | — | — | — | — | — | — |
| Component (B) | Type | HSA | HSA | HSA | HSA | HSA | HSA | HSA | HSA |
| | % by mass | 1 | 1 | 1 | 1 | 1 | 1 | 1 | 1 |
| Component (C) | Type | I-184 | I-184 | I-184 | I-184 | I-184 | I-184 | I-184 | I-184 |
| | % by mass | 1 | 1 | 1 | 1 | 1 | 1 | 1 | 1 |
| | Type | — | — | — | — | — | — | — | — |
| | % by mass | — | — | — | — | — | — | — | — |
| | Type | — | — | — | — | — | — | — | — |
| | % by mass | — | — | — | — | — | — | — | — |
| Component (D) | Type | — | PARLEAM 6 | — | — | — | LIQUID P | — | — |
| | % by mass | — | 20 | — | — | — | 10 | — | — |
| Component (E) | Type | — | — | — | — | — | — | — | — |
| | % by mass | — | — | — | — | — | — | — | — |
| Evaluation | | | | | | | | | |
| Step height covering properties | — | A | A | A | A | A | A | A | A |
| Self-organization properties | — | 4 | 4 | 4 | 4 | 4 | 4 | 4 | 4 |
| Transparency | — | 4 | 4 | 4 | 4 | 4 | 4 | 4 | 4 |
| Curing shrinkage ratio | % | 0.6 | 0.5 | 1 | 1 | 0.4 | 0.4 | 0.4 | 0.4 |
| Dielectric constant | — | 2.9 | 2.3 | 3.3 | 3.5 | 3.3 | 2.8 | 2.7 | 2.7 |

| | | Example | | | | | | | |
|---|---|---|---|---|---|---|---|---|---|
| | | 44 | 45 | 46 | 47 | 48 | 49 | 50 | 51 |
| Raw material | | | | | | | | | |
| Component (A) | Type | UC-102 | UC-102 | UC-102 | UC-203 | UC-203 | UC-203 | UC-203 | UC-203 |
| | % by mass | 30 | 30 | 56.4 | 49 | 49 | 38 | 56.4 | 63 |
| | Type | RICON 130 | FA-512M | FA-512M | FA-512M | FA-129AS | HOB | FA-512M | FA-711MM |
| | % by mass | 58 | 10 | 12 | 49 | 49 | 5 | 12 | 12 |
| | Type | FA-BZA | — | HPMA | — | — | FA-512M | HPMA | HPMA |
| | % by mass | 10 | — | 2 | — | — | 16 | 2 | 2 |
| | Type | — | — | FA-BZA | — | — | — | FA-BZA | — |
| | % by mass | — | — | 4 | — | — | — | 4 | — |
| Component (B) | Type | HSA | HSA | HSA | HSA | HSA | HSA | HSA | HSA |
| | % by mass | 1 | 1 | 1 | 1 | 1 | 1 | 1 | 1 |
| Component (C) | Type | I-184 | I-184 | I-184 | I-184 | I-184 | I-184 | I-184 | I-184 |
| | % by mass | 1 | 1 | 0.2 | 1 | 1 | 3 | 0.2 | 0.5 |
| | Type | — | — | TPO | — | — | TPO | TPO | TPO |
| | % by mass | — | — | 1.4 | — | — | 1 | 1.4 | 1 |
| | Type | — | — | — | — | — | — | — | TMBP |
| | % by mass | — | — | — | — | — | — | — | 0.5 |
| Component (D) | Type | — | POLYOIL | POLYOIL | — | — | POLYOIL | POLYOIL | POLYOIL |
| | % by mass | — | 58 | 20 | — | — | 20 | 20 | 20 |
| Component (E) | Type | — | — | P85 | — | — | P85 | P85 | — |
| | % by mass | — | — | 3 | — | — | 16 | 3 | — |
| Evaluation | | | | | | | | | |
| Step height covering properties | — | A | A | A | A | A | A | A | A |
| Self-organization properties | — | 4 | 4 | 4 | 4 | 4 | 4 | 4 | 4 |
| Transparency | — | 4 | 4 | 4 | 4 | 4 | 4 | 4 | 4 |
| Curing shrinkage ratio | % | 0.4 | 0.4 | 0.8 | 1.2 | 1.4 | 1.5 | 1.8 | 1.4 |
| Dielectric constant | — | 2.7 | 2.9 | 2.7 | 3.1 | 3.2 | 2.9 | 3.1 | 3 |

TABLE 6

| | | Example | | | | | | | |
|---|---|---|---|---|---|---|---|---|---|
| | | 52 | 53 | 54 | 55 | 56 | 57 | 58 | 59 | 60 |
| Raw material | | | | | | | | | | |
| Component (A) | Type | EHA | Manufacturing Example 10 | Manufacturing Example 10 | Manufacturing Example 10 | Manufacturing Example 10 | Manufacturing Example 10 | Manufacturing Example 10 | Manufacturing Example 10 | Manufacturing Example 10 |
| | % by mass | 49 | 48 | 48.65 | 45 | 45 | 68 | 44 | 44 | 34.5 |
| | Type | TEAI-1000 | RICON 130 | RICON 130 | RICON 130 | RICON 130 | — | IBXA | IBXA | IBXA |

TABLE 6-continued

| | | Example | | | | | | | | |
|---|---|---|---|---|---|---|---|---|---|---|
| | | 52 | 53 | 54 | 55 | 56 | 57 | 58 | 59 | 60 |
| | % by mass | 49 | 30 | 30 | 30 | 27 | — | 20 | 20 | 5 |
| | Type | — | — | — | — | — | — | RICON 130 | — | FA-314A |
| | % by mass | — | — | — | — | — | — | 30 | — | 10 |
| | Type | — | — | — | — | — | — | — | — | RICON 130 |
| | % by mass | — | — | — | — | — | — | — | — | 10 |
| | Type | — | — | — | — | — | — | — | — | RICON 131 |
| | % by mass | — | — | — | — | — | — | — | — | 35 |
| Component (B) | Type | HSA | HSA | HSA | HSA | HSA | HSA | HSA | HSA | HSA |
| | % by mass | 1 | 1 | 0.35 | 4 | 9 | 1 | 1 | 1 | 1 |
| Component (C) | Type | I-184 | I-184 | I-184 | I-184 | I-184 | I-184 | I-184 | I-184 | I-819 |
| | % by mass | 1 | 1 | 1 | 1 | 1 | 1 | 1 | 1 | 0.5 |
| Component (D) | Type | — | Manufacturing Example 4 | Manufacturing Example 4 | Manufacturing Example 4 | Manufacturing Example 4 | Manufacturing Example 4 | PE-1 | PE-1 | PE-1 |
| | % by mass | — | 20 | 20 | 20 | 18 | 30 | 4 | 4 | 4 |
| | Type | — | — | — | — | — | — | — | DUP | — |
| | % by mass | — | — | — | — | — | — | — | 30 | — |
| Component (E) | Type | — | — | — | — | — | — | — | — | — |
| | % by mass | — | — | — | — | — | — | — | — | — |
| Evaluation | | | | | | | | | | |
| Step height covering properties | — | — | A | A | A | A | A | A | A | A |
| Self-organization properties | — | — | 4 | 4 | 4 | 4 | 4 | 4 | 4 | 4 |
| Transparency | — | — | 4 | 4 | 4 | 4 | 3 | 4 | 4 | 4 |
| Curing shrinkage ratio | % | 1 | 0.5 | 0.5 | 0.5 | 0.5 | 0.7 | 1 | 0.9 | 0.9 |
| Dielectric constant | — | 2.4 | 2.8 | 2.8 | 2.8 | 2.8 | 3.2 | 2.8 | 3.2 | 2.8 |

Examples 61 to 105 and Reference Examples 1 and 2

Examples 61 to 105

99 parts by mass of each of the compounds (A) having a photopolymerizable functional group represented by the general formulae (13) to (55) and 1 part by mass of 12-hydroxystearic acid (B) as the oil gelling agent were charged in a 2-mL screw tube, and the screw tube was heated in a water bath at 90° C. to dissolve the 12-hydroxystearic acid. Thereafter, the evaluation of self-organization properties and the evaluation of transparency were carried out. Evaluation results are shown in FIGS. 4 to 8.

Figure 5:
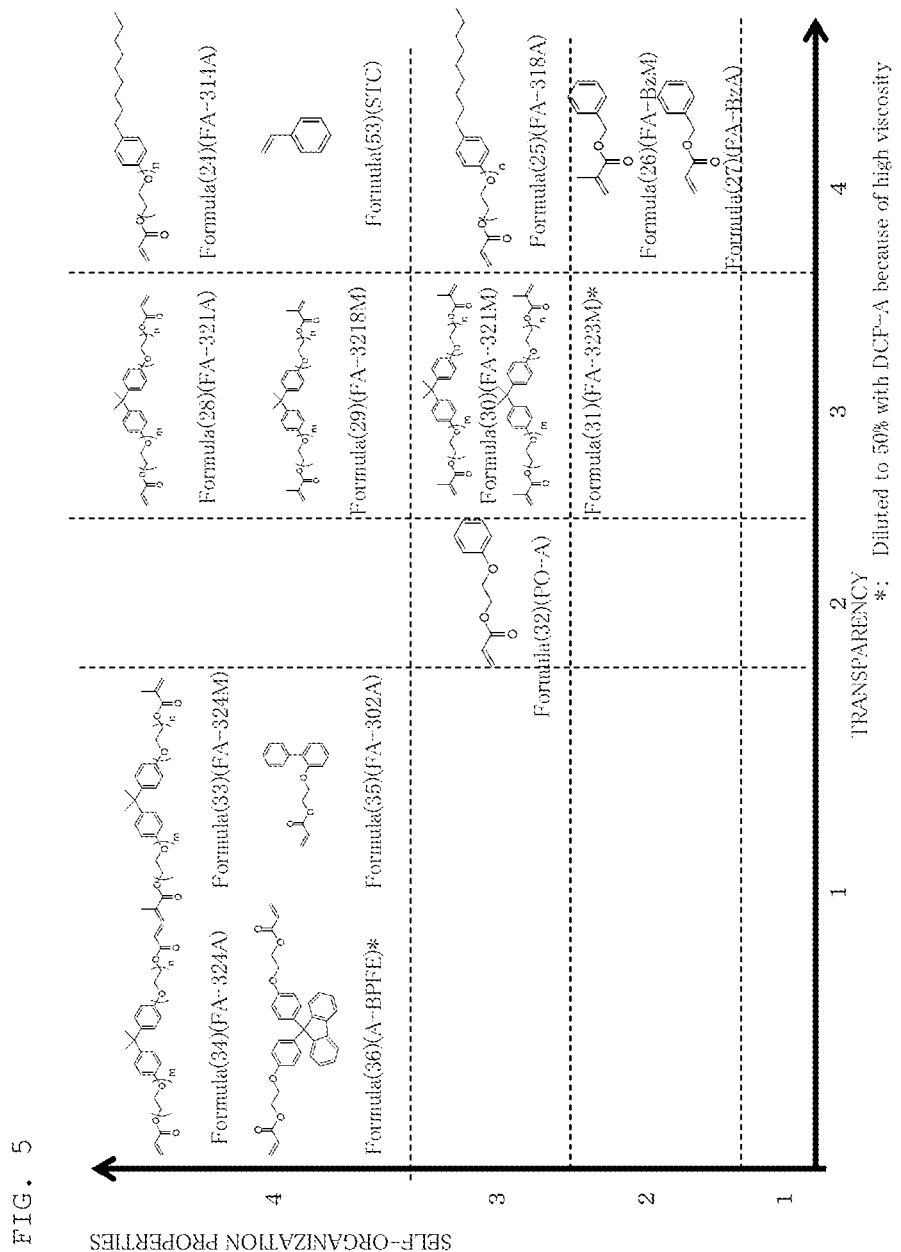
FIG. 5 is a graph showing evaluation results of Examples using a (meth)acrylate having an aromatic ring as the component (A).
Figure 6:
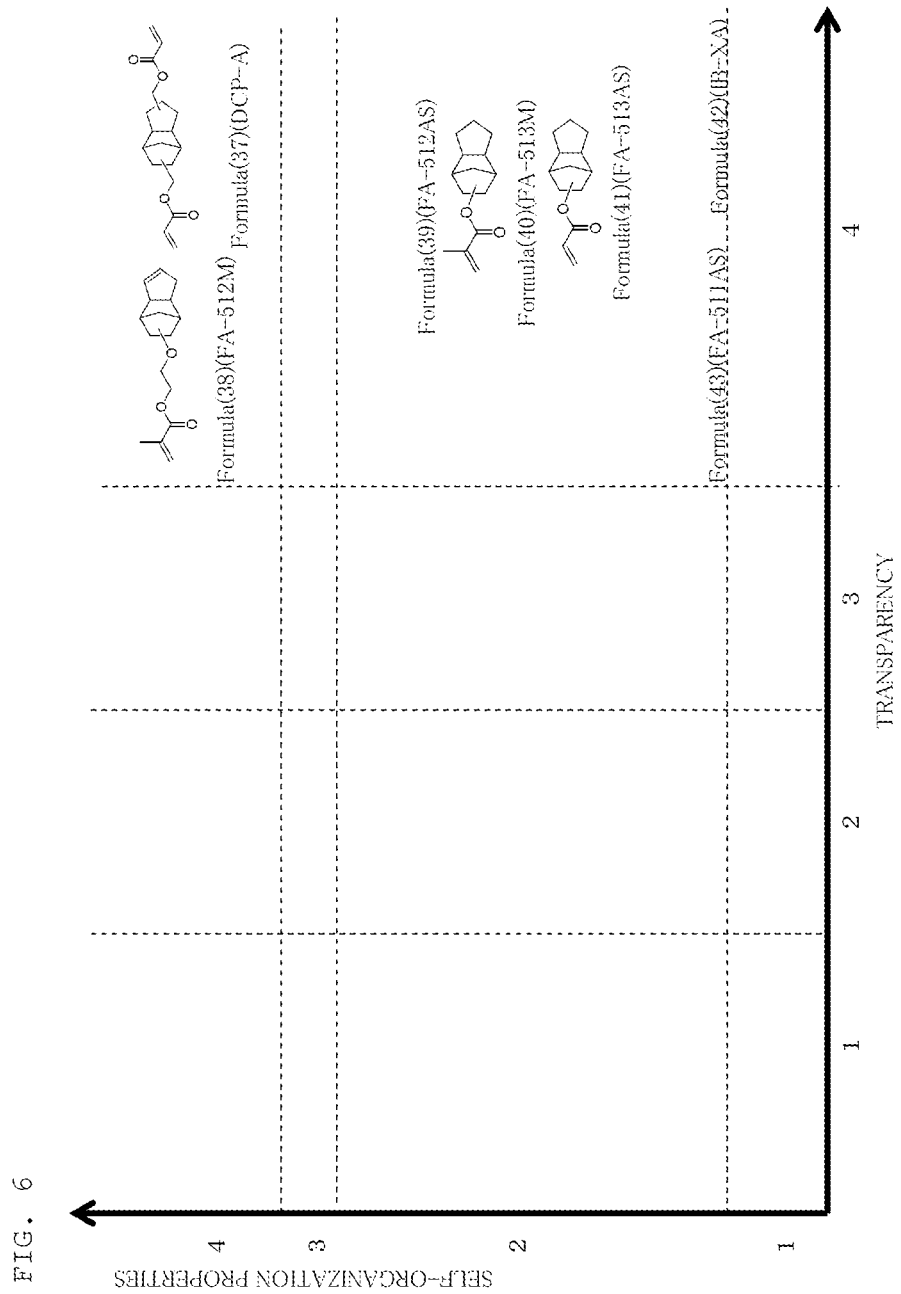
FIG. 6 is a graph showing evaluation results of Examples using a (meth)acrylate having an alicyclic group as the component (A).
Figure 7:
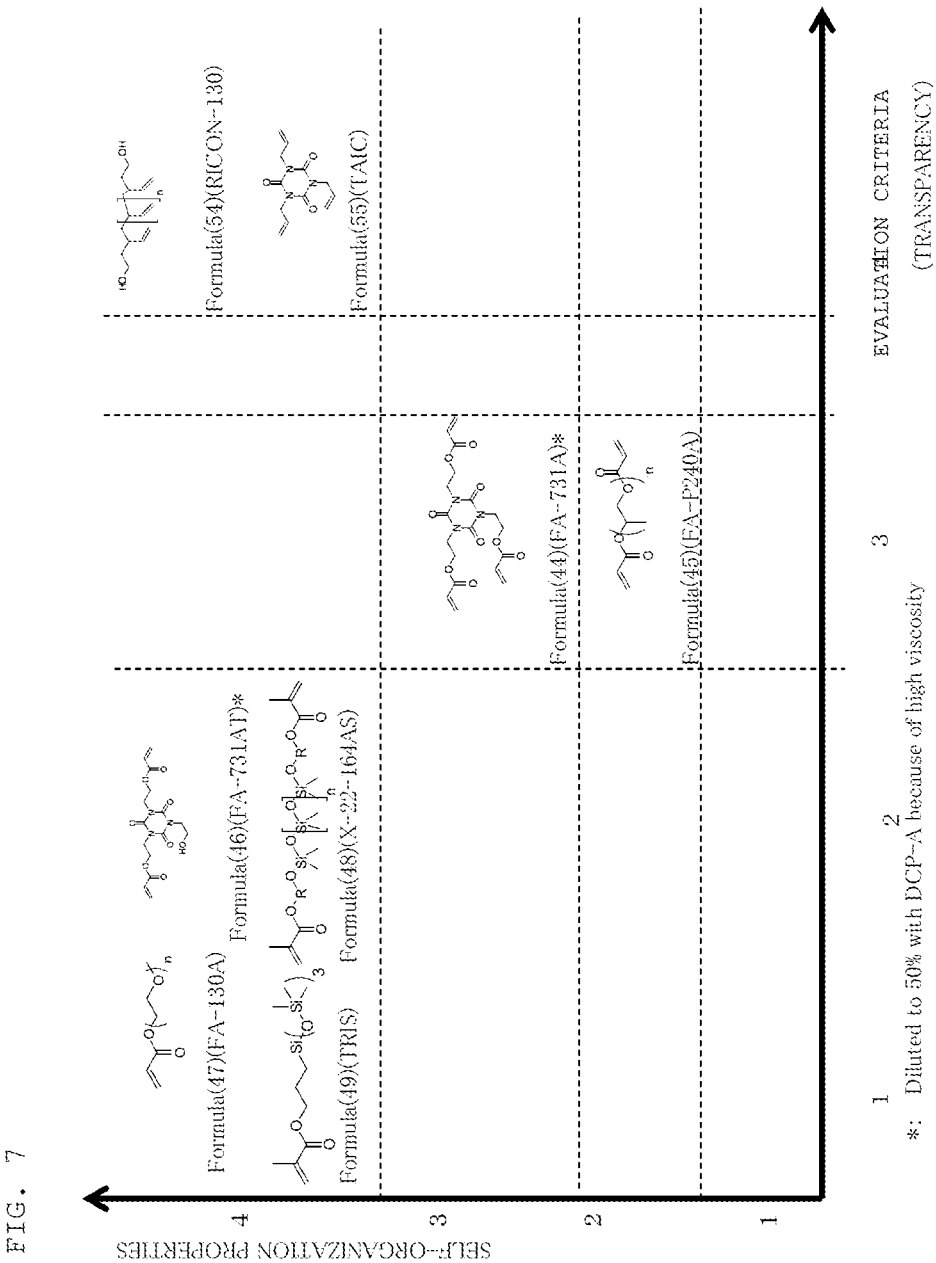
FIG. 7 is a graph showing evaluation results of Examples using a heteroatom-based (meth)acrylate, a compound having a vinyl group, or a compound having an allyl group, respectively as the component (A).

However, since the compounds (A) marked with a symbol in FIGS. 4 to 9, namely the compounds of the general formulae (31) and (36) in FIG. 5, the compounds of the general formulae (44) and (46) in FIG. 7, the compounds of the general formulae (50) to (52) in FIG. 8 have a high viscosity, each of these compounds was diluted to 50% by mass with LIGHT ACRYLATE DCP-A (a trade name for dimethylol tricyclodecane diacrylate, manufactured by Kyoeisha Chemical Co., Ltd.). That is, as for these compounds, each of the compounds was diluted with DCP-A such that the content thereof was 50% by mass in the total amount of the compound and DCF-A, and then subjected to the same evaluations.

In addition, after carrying out the evaluation of self-organization properties and the evaluation of transparency, the evaluation of step height covering properties was also carried out. As a result, in all of Examples 61 to 105, it was confirmed that filling was achieved leaving no air gap in the level difference part without causing leakage. Incidentally, with respect to the Examples in which the evaluation result of the self-organization properties was "2", the portion in a liquid state was removed, and the step height covering properties were evaluated.

Reference Examples 1 and 2

With respect to the compounds (D) of the general formulae (56) and (57), the same operations as those in Example 61 were carried out. The evaluation results are shown in FIG. 9. Incidentally, these compounds (D) of the general formulae (56) and (57) were not diluted with DCP-A.

INDUSTRIAL APPLICABILITY

Since the photocurable resin composition according to the present invention hardly causes leakage and is easily formed into a desired shape, it is widely used as an adhesive; a pressure-sensitive adhesive; a filler; an optical member such as an optical wave guide, a member for solar batteries; a light emitting diode (LED), a phototransistor, a photodiode, an optical semiconductor element, an image display device, an illumination device, etc.; a dental material; and the like.

In particular, the photocurable resin composition according to the present invention makes it possible to manufacture a resin composition having excellent step height covering properties. In addition, when the photocurable resin composition according to the present invention is laminated and then crosslinked, it is able to enhance adhesive strength and holding power and reveal high reliability. Accordingly, the photocurable resin composition according to the present invention is suited for an application of an image display device, and in particular, it is extremely useful as a material for filling a layer-to-layer space between a panel such as a touch panel, etc. and a transparent protective plate such as a glass substrate, etc.

EXPLANATIONS OF LETTERS OR NUMERALS

7: Image display unit
10: Liquid crystal display cell
20: Polarizing plate
22: Polarizing plate 30: Touch panel
31: Transparent resin layer
32: Transparent resin layer
40: Transparent protective plate (protective panel)
50: Backlight system
60: Level difference part

What is claimed is:

1. A method for manufacturing an image display device comprising allowing a photocurable resin composition to intervene in a gap between an image display unit having an image display part and a transparent protective plate and curing the photocurable resin composition, wherein The photocurable resin composition containing a compound (A) having a photopolymerizable functional group and an oil gelling agent (B) is allowed to intervene in the gap and cured upon irradiation with light at lease from the side of the transparent protective plate.

2. The method for manufacturing an image display device according to claim 1, wherein the transparent protective plate has a level difference part.

3. The method for manufacturing an image display device according to claim 1, wherein the oil gelling agent (B) is at least one member of a hydroxy fatty acid, dextrin ester of fatty acid, n-lauroyl-L-glutamic acid-α,β-dibutylamide, di-p-methylbenzylidene sorbitol glucitol, 1,3:2,4-bis-O-benzylidene-D-glucitol, 1,3:2,4-bis-O-(4-methylbenzylidene)-D-sorbitol, bis(2-ethylhexanoato)hydroxyaluminum, and compounds represented by the following general formulae (1) to (12):

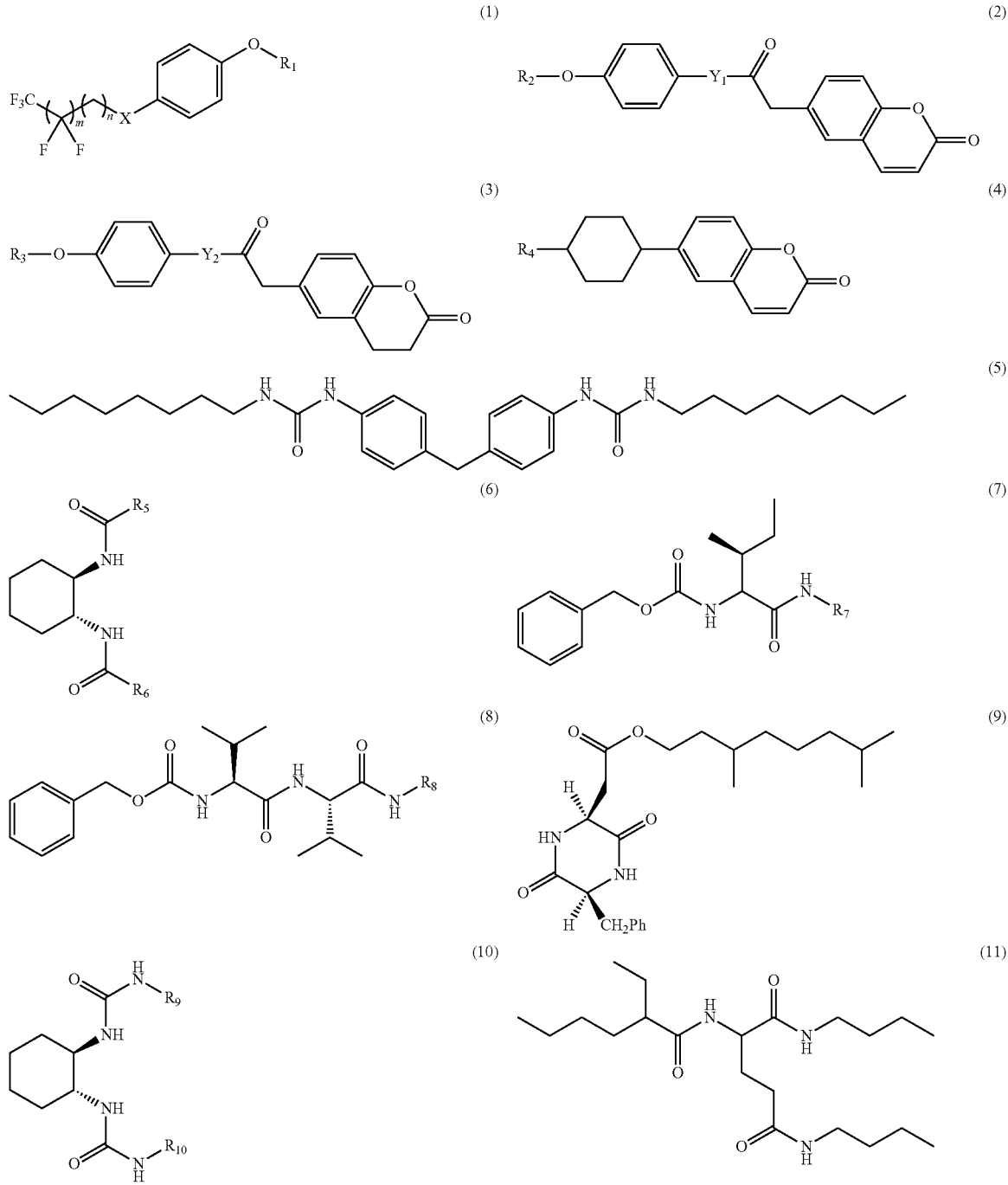

-continued

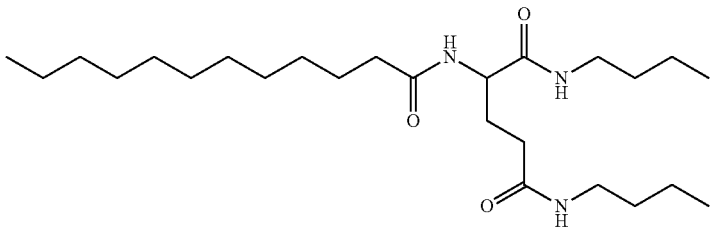

(12)

wherein
in the general formula (1), m is an integer of from 3 to 10; n is an integer of from 2 to 6; $R_1$ is a saturated hydrocarbon group having a carbon number of from 1 to 20; and X is sulfur or oxygen,
in the general formula (2), $R_2$ is a saturated hydrocarbon group having a carbon number of from 1 to 20; and $Y_1$ is a bond or a benzene ring,
in the general formula (3), $R_3$ is a saturated hydrocarbon group having a carbon number of from 1 to 20; and $Y_2$ is a bond or a benzene ring,
in the general formula (4), $R_4$ is a saturated hydrocarbon group having a carbon number of from 1 to 20,
in the general formula (6), $R_5$ and $R_6$ are each independently a saturated hydrocarbon group having a carbon number of from 1 to 20,
in the general formula (7), $R_7$ is a saturated hydrocarbon group having a carbon number of from 1 to 20,
in the general formula (8), $R_8$ is a saturated hydrocarbon group having a carbon number of from 1 to 20, and
in the general formula (10), $R_9$ and $R_{10}$ are each independently a saturated hydrocarbon group having a carbon number of from 1 to 20.

4. The method for manufacturing an image display device according to claim 1, wherein the compound (A) having a photopolymerizable functional group includes a compound having an ethylenically unsaturated group.

5. The method for manufacturing an image display device according to claim 1, wherein the photocurable resin composition further contains a photopolymerization initiator (C).

6. The method for manufacturing an image display device according to claim 1, wherein the photocurable resin composition further contains a compound (D) which is liquid at 25° C.

7. The method for manufacturing an image display device according to claim 1, wherein the photocurable resin composition further contains a compound (E) which is solid at 25° C.

* * * * *